US010775478B2

(12) United States Patent
Davis et al.

(10) Patent No.: US 10,775,478 B2
(45) Date of Patent: Sep. 15, 2020

(54) POWER CONTROL FOR IMPROVED NEAR-FAR PERFORMANCE OF RADAR SYSTEMS

(71) Applicant: UHNDER, INC., Austin, TX (US)

(72) Inventors: Curtis Davis, St. Louis, MO (US);
Jean P. Bordes, St. Charles, MO (US);
Monier Maher, St. Louis, MO (US);
Wayne Stark, Ann Arbor, MI (US);
Raghunath K. Rao, Austin, TX (US)

(73) Assignee: UHNDER, INC., Austin, TX (US)

( * ) Notice: Subject to any disclaimer, the term of this patent is extended or adjusted under 35 U.S.C. 154(b) by 242 days.

(21) Appl. No.: 15/822,629

(22) Filed: Nov. 27, 2017

(65) Prior Publication Data
US 2018/0081029 A1 Mar. 22, 2018

Related U.S. Application Data

(63) Continuation of application No. 15/690,899, filed on Aug. 30, 2017, now Pat. No. 9,829,567, which is a
(Continued)

(51) Int. Cl.
*G01S 7/282* (2006.01)
*G01S 7/03* (2006.01)
(Continued)

(52) U.S. Cl.
CPC .............. *G01S 7/282* (2013.01); *G01S 7/023* (2013.01); *G01S 7/032* (2013.01); *G01S 13/18* (2013.01);
(Continued)

(58) Field of Classification Search
CPC .......... G01S 7/282; G01S 7/032; G01S 7/023; G01S 13/70; G01S 13/18; G01S 13/931;
(Continued)

(56) References Cited

U.S. PATENT DOCUMENTS 1,882,128 A 10/1932 Fearing
3,374,478 A 3/1968 Blau
(Continued)

FOREIGN PATENT DOCUMENTS

EP 0509843 A2 * 10/1992 ............ G01S 7/032
EP 0725480 11/2011
(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Bernarr E Gregory
(74) *Attorney, Agent, or Firm* — Gardner Linn

(57) ABSTRACT

A radar system includes a transmitter, a receiver and a processor. The receiver receives radio signal that includes the transmitted radio signal reflected from targets in the environment. The received radio signal is provided to the processor. The processor samples the received radio signal during a plurality of time intervals to produce a sampled stream. The different time intervals of the plurality of time intervals will contain different signal levels of radio signals reflected from the targets. The processor also selects a particular time interval of the plurality of time intervals that is free of samples of radio signals reflected off of the targets that are closer than a first threshold distance from an equipped vehicle. The transmitter and/or the receiver is adjusted such that samples of radio signals reflected off of targets that are farther than the first threshold distance are detected.

25 Claims, 29 Drawing Sheets

Radar system architecture

Related U.S. Application Data continuation of application No. 15/292,755, filed on Oct. 13, 2016, now Pat. No. 9,753,121.

(60) Provisional application No. 62/371,257, filed on Aug. 5, 2016, provisional application No. 62/361,587, filed on Jul. 13, 2016, provisional application No. 62/352,277, filed on Jun. 20, 2016.

(51) Int. Cl.
*G01S 7/02* (2006.01)
*G01S 13/70* (2006.01)
*G01S 13/18* (2006.01)
*G01S 13/931* (2020.01)
*G01S 13/00* (2006.01)

(52) U.S. Cl.
CPC ............ *G01S 13/70* (2013.01); *G01S 13/931* (2013.01); *G01S 7/038* (2013.01); *G01S 2013/9321* (2013.01); *G01S 2013/93271* (2020.01); *G01S 2013/93272* (2020.01); *G01S 2013/93275* (2020.01)

(58) Field of Classification Search
CPC ............ G01S 2013/9375; G01S 7/038; G01S 2013/9378; G01S 2013/9389; G01S 2013/9321; G01S 17/936; G01S 13/0209; G01S 2013/93275; G01S 2013/93272; G01S 2013/93271; G01S 7/35; G01S 13/56; G01S 13/348
See application file for complete search history.

(56) References Cited

U.S. PATENT DOCUMENTS

| | | |
|---|---|---|
| 3,735,398 A | 5/1973 | Ross |
| 3,750,169 A * | 7/1973 | Strenglein ............ G01S 13/931 342/21 |
| 3,766,554 A * | 10/1973 | Tresselt ............... G01S 13/348 342/129 |
| 3,896,434 A | 7/1975 | Sirven |
| 3,932,871 A * | 1/1976 | Foote ..................... G01S 13/56 342/28 |
| 4,078,234 A | 3/1978 | Fishbein et al. |
| 4,176,351 A | 11/1979 | De Vita et al. |
| 4,308,536 A * | 12/1981 | Sims, Jr. ............... G01S 13/931 342/109 |
| 4,566,010 A | 1/1986 | Collins |
| 4,939,685 A | 7/1990 | Feintuch |
| 5,001,486 A | 3/1991 | Bächtiger |
| 5,034,906 A | 7/1991 | Chang |
| 5,087,918 A | 2/1992 | May et al. |
| 5,151,702 A | 9/1992 | Urkowitz |
| 5,175,710 A | 12/1992 | Hutson |
| 5,218,619 A | 6/1993 | Dent |
| 5,280,288 A | 1/1994 | Sherry et al. |
| 5,302,956 A | 4/1994 | Asbury et al. |
| 5,341,141 A | 8/1994 | Frazier et al. |
| 5,345,470 A | 9/1994 | Alexander |
| 5,361,072 A * | 11/1994 | Barrick ..................... G01S 7/35 342/133 |
| 5,379,322 A | 1/1995 | Kosaka et al. |
| 5,508,706 A | 4/1996 | Tsou et al. |
| 5,657,023 A | 8/1997 | Lewis et al. |
| 5,712,640 A | 1/1998 | Andou |
| 5,724,041 A | 3/1998 | Inoue et al. |
| 5,892,477 A | 4/1999 | Wehling |
| 5,917,430 A | 6/1999 | Greneker, III et al. |
| 5,920,285 A | 7/1999 | Benjamin |
| 5,931,893 A | 8/1999 | Dent et al. |
| 5,959,571 A | 9/1999 | Aoyagi et al. |
| 5,970,400 A | 10/1999 | Dwyer |
| 6,067,314 A | 5/2000 | Azuma |
| 6,069,581 A | 5/2000 | Bell et al. |
| 6,121,872 A | 9/2000 | Weishaupt |
| 6,121,918 A | 9/2000 | Tullsson |
| 6,151,366 A | 11/2000 | Yip |
| 6,163,252 A | 12/2000 | Nishiwaki |
| 6,184,829 B1 | 2/2001 | Stilp |
| 6,191,726 B1 | 2/2001 | Tullsson |
| 6,208,248 B1 * | 3/2001 | Ross ..................... G01S 13/0209 340/552 |
| 6,288,672 B1 | 9/2001 | Asano et al. |
| 6,307,622 B1 | 10/2001 | Lewis |
| 6,347,264 B2 | 2/2002 | Nicosia et al. |
| 6,400,308 B1 | 6/2002 | Bell et al. |
| 6,411,250 B1 | 6/2002 | Oswald et al. |
| 6,417,796 B1 | 7/2002 | Bowlds |
| 6,583,753 B1 | 6/2003 | Reed |
| 6,614,387 B1 | 9/2003 | Deadman |
| 6,624,784 B1 | 9/2003 | Yamaguchi |
| 6,674,908 B1 | 1/2004 | Aronov |
| 6,714,956 B1 | 3/2004 | Liu et al. |
| 6,747,595 B2 | 6/2004 | Hirabe |
| 6,768,391 B1 | 7/2004 | Dent et al. |
| 6,975,246 B1 | 12/2005 | Trudeau |
| 7,119,739 B1 | 10/2006 | Struckman |
| 7,202,776 B2 * | 4/2007 | Breed ..................... G01S 17/936 340/435 |
| 7,289,058 B2 | 10/2007 | Shima |
| 7,299,251 B2 | 11/2007 | Skidmore et al. |
| 7,338,450 B2 | 3/2008 | Kristofferson et al. |
| 7,395,084 B2 | 7/2008 | Anttila |
| 7,460,055 B2 | 12/2008 | Nishijima et al. |
| 7,545,310 B2 | 6/2009 | Matsuoka |
| 7,545,321 B2 | 6/2009 | Kawasaki |
| 7,564,400 B2 | 7/2009 | Fukuda |
| 7,567,204 B2 | 7/2009 | Sakamoto |
| 7,609,198 B2 | 10/2009 | Chang |
| 7,642,952 B2 | 1/2010 | Fukuda |
| 7,663,533 B2 | 2/2010 | Toennesen |
| 7,728,762 B2 | 6/2010 | Sakamoto |
| 7,791,528 B2 | 9/2010 | Klotzbuecher |
| 7,847,731 B2 | 12/2010 | Wiesbeck et al. |
| 7,855,677 B2 | 12/2010 | Negoro et al. |
| 7,859,450 B2 | 12/2010 | Shirakawa et al. |
| 8,019,352 B2 | 9/2011 | Rappaport et al. |
| 8,049,663 B2 | 11/2011 | Frank et al. |
| 8,059,026 B1 | 11/2011 | Nunez |
| 8,102,306 B2 | 1/2012 | Smith, Jr. et al. |
| 8,154,436 B2 | 4/2012 | Szajnowski |
| 8,169,359 B2 * | 5/2012 | Aoyagi ................. G01S 13/931 342/104 |
| 8,330,650 B2 | 12/2012 | Goldman |
| 8,390,507 B2 | 3/2013 | Wintermantel |
| 8,471,760 B2 | 6/2013 | Szajnowski |
| 8,532,159 B2 | 9/2013 | Kagawa et al. |
| 8,547,988 B2 | 10/2013 | Hadani et al. |
| 8,686,894 B2 | 4/2014 | Fukuda et al. |
| 8,694,306 B1 | 4/2014 | Short et al. |
| 9,121,943 B2 | 9/2015 | Stirlin-Gallacher et al. |
| 9,239,378 B2 | 1/2016 | Kishigami et al. |
| 9,239,379 B2 | 1/2016 | Burgio et al. |
| 9,274,217 B2 * | 3/2016 | Chang ..................... G01S 7/032 |
| 9,282,945 B2 | 3/2016 | Smith et al. |
| 9,335,402 B2 | 5/2016 | Maeno et al. |
| 9,541,639 B2 | 1/2017 | Searcy et al. |
| 9,568,600 B2 | 2/2017 | Alland |
| 9,575,160 B1 | 2/2017 | Davis et al. |
| 9,599,702 B1 | 3/2017 | Bordes et al. |
| 9,689,967 B1 | 6/2017 | Stark et al. |
| 9,720,073 B1 | 8/2017 | Davis et al. |
| 9,753,121 B1 | 9/2017 | Davis |
| 9,753,132 B1 | 9/2017 | Bordes et al. |
| 9,772,397 B1 | 9/2017 | Bordes et al. |
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 2001/0002919 A1 | 6/2001 | Sourour et al. |
| 2002/0004692 A1 | 1/2002 | Nicosia et al. |
| 2002/0044082 A1 | 4/2002 | Woodington et al. |

(56) References Cited

U.S. PATENT DOCUMENTS

| | | |
|---|---|---|
| 2002/0075178 A1 | 6/2002 | Woodington et al. |
| 2002/0118522 A1 | 8/2002 | Ho et al. |
| 2002/0130811 A1 | 9/2002 | Voigtaender |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0102997 A1 | 6/2003 | Levin et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0138802 A1 | 7/2004 | Kuragaki et al. |
| 2005/0069162 A1 | 3/2005 | Haykin |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0220943 A1 * | 10/2006 | Schlick ............... G01S 13/931 342/70 |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0109175 A1 | 5/2007 | Fukuda |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0279303 A1 | 12/2007 | Schoebel |
| 2008/0208472 A1 | 8/2008 | Morcom |
| 2008/0272955 A1 | 11/2008 | Yonak et al. |
| 2009/0015459 A1 | 1/2009 | Mahler et al. |
| 2009/0015464 A1 | 1/2009 | Fukuda |
| 2009/0051581 A1 | 2/2009 | Hatono |
| 2009/0073025 A1 | 3/2009 | Inoue et al. |
| 2009/0079617 A1 | 3/2009 | Shirakawa et al. |
| 2009/0085827 A1 | 4/2009 | Orime et al. |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0267822 A1 | 10/2009 | Shinoda et al. |
| 2009/0289831 A1 | 11/2009 | Akita |
| 2009/0295623 A1 | 12/2009 | Falk |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0277359 A1 | 11/2010 | Ando |
| 2011/0006944 A1 | 1/2011 | Goldman |
| 2011/0032138 A1 | 2/2011 | Krapf |
| 2011/0187600 A1 | 8/2011 | Landt |
| 2011/0196568 A1 | 8/2011 | Nickolaou |
| 2011/0234448 A1 * | 9/2011 | Hayase ............... G01S 13/931 342/70 |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2012/0001791 A1 | 1/2012 | Wintermantel |
| 2012/0050093 A1 | 3/2012 | Heilmann et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0257643 A1 | 10/2012 | Wu et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0069818 A1 | 3/2013 | Shirakawa et al. |
| 2013/0102254 A1 | 4/2013 | Cyzs |
| 2013/0113653 A1 | 5/2013 | Kishigami et al. |
| 2013/0135140 A1 | 5/2013 | Kishigami |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0070985 A1 | 3/2014 | Vacanti |
| 2014/0085128 A1 | 3/2014 | Kishigami et al. |
| 2014/0111372 A1 | 4/2014 | Wu |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0285373 A1 | 9/2014 | Kuwahara et al. |
| 2014/0327566 A1 | 11/2014 | Burgio et al. |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0198709 A1 | 7/2015 | Inoue |
| 2015/0204966 A1 | 7/2015 | Kishigami |
| 2015/0204971 A1 | 7/2015 | Kuehnle |
| 2015/0226848 A1 | 8/2015 | Park |
| 2015/0234045 A1 | 8/2015 | Rosenblum |
| 2015/0247924 A1 | 9/2015 | Kishigami |
| 2015/0301172 A1 | 10/2015 | Ossowska |
| 2015/0323660 A1 | 11/2015 | Hampikian |
| 2015/0331090 A1 | 11/2015 | Jeong et al. |
| 2016/0003939 A1 | 1/2016 | Stainvas Olshansky et al. |
| 2016/0018511 A1 | 1/2016 | Nayyar et al. |
| 2016/0033631 A1 | 2/2016 | Searcy et al. |
| 2016/0041260 A1 | 2/2016 | Cao et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0139254 A1 | 5/2016 | Wittenberg |
| 2016/0238694 A1 | 8/2016 | Kishigami |
| 2017/0023661 A1 | 1/2017 | Richert |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |

FOREIGN PATENT DOCUMENTS

| | | | |
|---|---|---|---|
| EP | 2374217 | 4/2013 | |
| EP | 2884299 A1 * | 6/2015 | ............ G01S 13/38 |
| EP | 2821808 | 7/2015 | |
| FR | 2751086 | 1/1998 | |
| WO | WO2008/022981 A1 * | 2/2008 | ............ G01S 13/18 |
| WO | WO2015175078 | 11/2015 | |
| WO | WO2015185058 | 12/2015 | |
| WO | WO2016011407 | 1/2016 | |
| WO | WO2016030656 | 3/2016 | |
| WO | 2017059961 | 4/2017 | |
| WO | WO2017187330 | 11/2017 | |

(56) References Cited

FOREIGN PATENT DOCUMENTS

OTHER PUBLICATIONS

Fraser, "Design and simulation of a coded sequence ground penetrating radar," In: Diss. University of British Columbia, Dec. 3, 2015.
Zhou et al., "Linear extractors for extracting randomness from noisy sources," In: Information Theory Proceedings (ISIT), 2011 IEEE International Symposium on Oct. 3, 2011.
European Search Report dated Dec. 12, 2019 for corresponding EP Application No. EP17788891.4.
Levanan Nadav et al., "Non-coherent pulse compression—aperiodic and periodic waveforms", IET Radar, Sonar & Navagation, The Institution of Engineering and Technology, Jan. 1, 2016, pp. 216-224, vol. 10, Iss. 1, UK.
Akihiro Kajiwara, "Stepped-FM Pulse Radar for Vehicular Collision Avoidance", Electronics and Communications in Japan, Part 1, Mar. 1998, pp. 234-239, vol. 82, No. 6 1999.
European Search Report dated Jan. 10, 2020 for corresponding EP Application No. EP17814832.6.

\* cited by examiner

FIG. 5

How Digital Radar work
Applying a Binary Code to the inverter block:
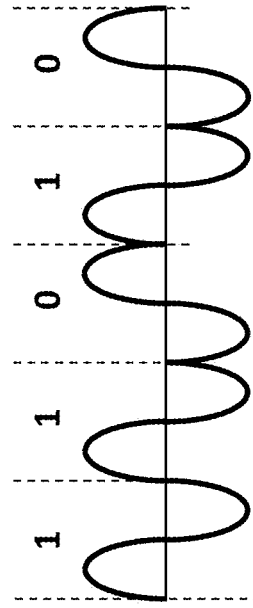
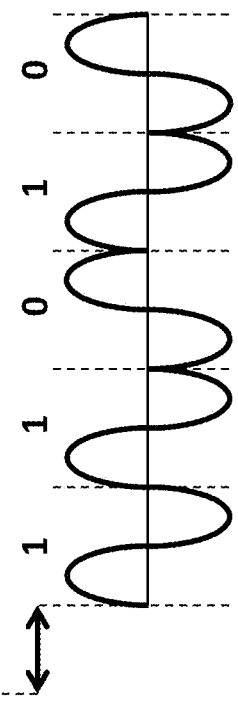
Receiving a Binary Code :
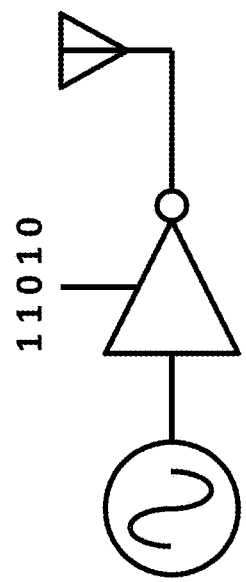
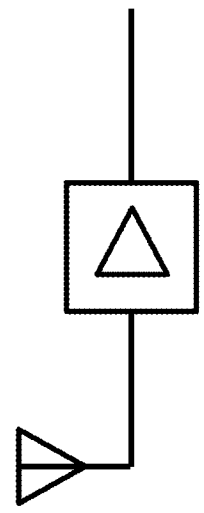
The returning wave form is strongly correlated with the used binary code.
FIG. 9

FIG. 14: Correlator outputs for total signal

*FIG. 16: Correlator outputs for total signal*

FIG. 17: Correlator outputs for total signal (zoomed in)

Digital Processor: for determining correlation of signals with
required spreading codes implemented with several FFT
operations, an IFFT, and a mixer.

The output of the ADC (x) is padded (appended) with zeros, while the chips output (a) from the code generator are also zero padded (prepended).

POWER CONTROL FOR IMPROVED NEAR-FAR PERFORMANCE OF RADAR SYSTEMS

CROSS REFERENCE TO RELATED APPLICATIONS

The present application is a continuation of U.S. patent application Ser. No. 15/690,899, filed Aug. 30, 2017, now U.S. Pat. No. 9,829,567, which is a continuation of U.S. patent application Ser. No. 15/292,755, filed Oct. 13, 2016, now U.S. Pat. No. 9,753,121, which claims the filing benefits of U.S. provisional applications, Ser. No. 62/371,257, filed Aug. 5, 2016, Ser. No. 62/361,587, filed Jul. 13, 2016, and Ser. No. 62/352,277, filed Jun. 20, 2016, which are all hereby incorporated by reference herein in their entireties.

FIELD OF THE INVENTION

The present invention is directed to radar systems, and in particular to radar systems for vehicles.

BACKGROUND OF THE INVENTION

The use of radar to determine range and velocity of objects in an environment is important in a number of applications including automotive radar and gesture detection. A radar typically transmits a signal and listens for the reflection of the signal from objects in the environment.

SUMMARY OF THE INVENTION

The present invention provides methods and a system for achieving better performance in a radar system when there is a near object and a far object. The invention accomplishes better detectability of the far object in the presence of a near object by altering the transmission power as a function of time.

A radar sensing system for a vehicle comprises at least one transmitter, at least one receiver, and a processor. The at least one transmitter is configured for installation and use on a vehicle, and able to transmit a radio frequency (RF) signal. The at least one transmitter is further able to power shape the transmitted RF signal. The transmitted RF signal decreases in power over a plurality of time intervals. The at least one receiver is configured for installation and use on the vehicle, and able to receive a reflected RF signal. The reflected RF signal is the transmitted RF signal reflected from targets in the environment. The reflected RF signal is down-converted and the result provided to the processor. The processor samples the down-converted reflected RF signal to produce a sampled stream. The processor is able to process the sampled stream during the plurality of time intervals. The different time intervals of the plurality of time intervals will contain different signal levels of RF signals reflected from near and far targets. The processor is further able to select samples in the sampled stream over a selected time interval of the plurality of time intervals that is free of RF signals reflected off of the near targets.

A radar sensing system for a vehicle comprises at least one transmitter, at least one receiver, and a processor. The at least one transmitter is configured for installation and use on a vehicle, and able to transmit a radio frequency (RF) signal. The at least one transmitter is further able to transmit the RF signal on a selected frequency during a selected time interval of a plurality of time intervals and to transmit the RF signal on another selected frequency during another selected time interval of the plurality of time intervals. The at least one receiver is configured for installation and use on the vehicle, and able to receive a reflected RF signal. The reflected RF signal is the transmitted RF signal reflected from objects in the environment. The reflected RF signal is down-converted and the result provided to the processor. The processor samples the down-converted reflected RF signal to produce a sampled stream. The processor is able to process the sampled stream during the plurality of time intervals. The different time intervals of the plurality of time intervals will contain different signal levels of RF signals reflected from targets. The processor is further operable to select samples in the sampled stream from a selected time interval of the plurality of time intervals that is free of RF signals reflected off of near targets.

A radar sensing system for a vehicle comprises at least one transmitter, at least one receiver, and a processor. The at least one transmitter is configured for installation and use on a vehicle, and able to transmit a radio frequency (RF) signal. The at least one transmitter is further able to power shape the transmitted RF signal. The transmitted RF signal decreases in power over time to compensate for the mismatched attenuations between near and far targets. The at least one transmitter is further able to transmit the RF signal on a selected frequency of a plurality of frequencies during a selected time interval of a plurality of time intervals and to transmit the RF signal on another selected frequency during another selected time interval of the plurality of time intervals. The at least one receiver is configured for installation and use on the vehicle, and able to receive a reflected RF signal on a plurality of frequencies. The reflected RF signal is the transmitted RF signal reflected from targets in the environment. The reflected RF signal is down-converted and the result provided to the processor. The processor samples the down-converted reflected RF signal to produce a sampled stream. The processor is able to process the sampled stream during a plurality of time intervals. The different time intervals of the plurality of time intervals will contain different signal levels of RF signals reflected from the targets. The processor is further able to select samples in the sampled stream over a selected time interval of the plurality of time intervals that is free of RF signals reflected off of near targets.

Signal processing of RF signals reflecting from near targets may occur during a first time interval of the plurality of time intervals, while signal processing of RF signals reflecting from distant targets may occur during a second time interval of the plurality of time intervals that is after the first time interval. During the first time interval, the transmitted RF signal may be decreasing in power, and during the second time interval, there is no transmitted RF signal. During the first time interval, the at least one receiver may ignore the reflected RF signal, and during the second time interval, the at least one receiver may receive the reflected RF signal. The reflected RF signal has a return signal strength of 1/r4, such that near and distant targets have a similar RCS.

The variable power is such that the RF signal reflected from a near object may have a lower transmitted power than the RF signal reflected from a most distant object at a given time. That is, a large amplitude RF signal is initially transmitted. The transmitted power is then decreased as a function of time. The processor may be further able to select a time interval of the plurality of time intervals to process a selected plurality of range bins. The RF signals reflected from the first near target are not large enough to interfere with RF signals reflected from the second distant target.

These and other objects, advantages, purposes and features of the present invention will become apparent upon review of the following specification in conjunction with the drawings.

BRIEF DESCRIPTION OF THE DRAWINGS

FIG. 5 is a two-dimensional array illustrating the time slice of FIG. 3 in accordance with the present invention;

FIGS. 8-10 illustrate aspects of how digital radar works;

DESCRIPTION OF THE PREFERRED EMBODIMENTS

Figure 1:
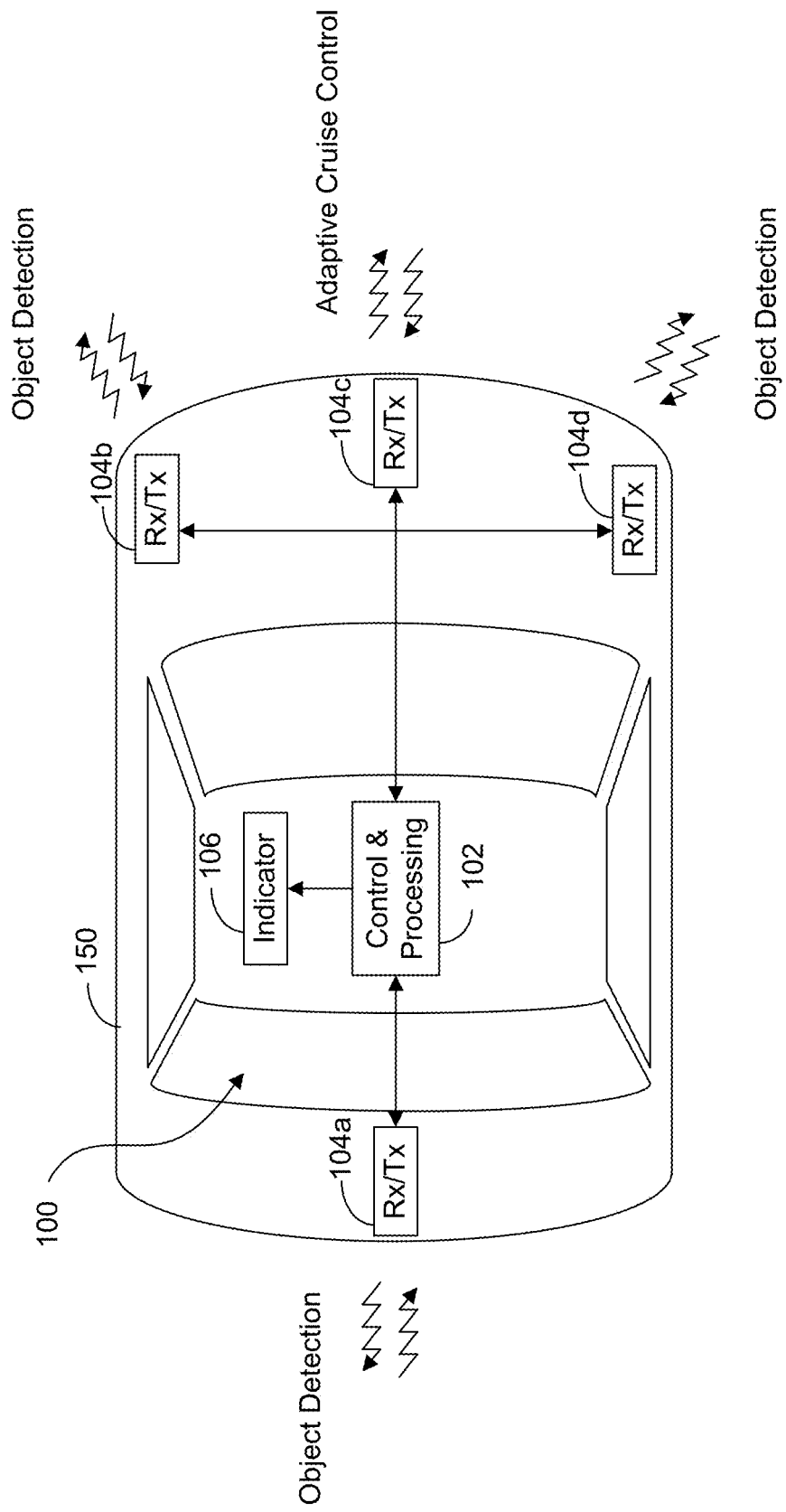
FIG. 1 is a plan view of an automobile equipped with a radar system in accordance with the present invention.

The present invention will now be described with reference to the accompanying figures, wherein numbered elements in the following written description correspond to like-numbered elements in the figures. Methods and systems of the present invention may achieve better performance from a radar system when there is a near object and a far object. Exemplary embodiments of the present invention accomplishes better detectably of the far object in the presence of a near object by altering the transmission power of the radar system as a function of time.

The present invention provides methods and a system for achieving better performance in a radar system when there is a near object and a far object. The invention accomplishes better detectability of the far object in the presence of a near object by altering transmission power as a function of time.

A radar system utilizes one or more transmitters to transmit radio frequency (RF) signals. These RF signals are reflected from objects in the environment, also called targets, by one or more receivers of the radar system. The radar system uses one or more receivers to receive RF signals. A transmitter/receiver pair is called a virtual radar. The receivers of the radar system have a down-converter that outputs complex valued digitized samples (i.e., values comprising a mathematical real component and a mathematical imaginary component) to a processor. The complex-valued digitized samples are correlated with various time-delayed replicas of the transmitted RF signals for different receivers. These samples are arranged in two-dimensional arrays known as time slices. The samples are placed into respective range bins of the two-dimensional array (as used herein, a range bin refers to a distance range corresponding to a particular time delay corresponding to the round trip time of the radar signal from a transmitter, to the target/object, and back to the receiver). The virtual receivers of the radar system (a virtual receiver for each virtual radar of the radar system) define an x-axis of the two-dimensional time slice and the range bins define a y-axis of the two-dimensional time slice. Another time slice comprising complex-valued samples is generated every 2-30 microseconds. Over a longer time interval, herein referred to as a "scan" (typically, in a duration of 1-60 milliseconds or longer), multiple time slices are accumulated to form a three-dimensional radar data cube. An x-axis of the three-dimensional radar data cube is defined by time (of each respective time slice requiring 2-30 microseconds), while the receivers (or virtual receivers) define a z-axis of the three-dimensional radar data cube, and the range bins and their corresponding time delays define a y-axis of the three-dimensional radar data cube. A radar data cube may have a preselected or dynamically defined quantity of time slices. For example, a radar data cube may include a 100 time slices or a 1000 time slices of data. Similarly, a radar data cube may include different numbers of range bins.

The complex-valued samples of the received RF signals are the products of a correlation between multiple time-delayed replicas of the transmitted RF signals—with a time-delayed replica corresponding to each range bin—and the received RF signals. When a particular time-delayed replica in a particular range bin correlates highly with the received RF signal, it is an indication of the time delay (i.e., range of the target/object) for the transmitted RF signal that is received after reflecting from a target/object. As discussed herein, each time slice contains one sample in a time series of samples upon which Doppler processing is performed (e.g., a Fast Fourier Transform). In other words, a time series of samples comprises the samples of a particular range bin for a particular receiver (or virtual receiver/radar). The longer the chain of time series of samples, the higher the Doppler resolution.

The transmitted radio frequency (RF) signals are reflected from objects in the environment and are received back at the radar receivers (or virtual receivers/radars). The transmitted signal from each radar transmitter consists of a baseband signal which is upconverted to an RF signal by an RF upconverter followed by an antenna. The received signal at each radar receiver antenna is downconverted by an RF downconverter to a complex baseband signal. The baseband transmitted RF signals and the reflected RF signals after down-conversion in the receiver are provided to the processor. As an example, a baseband signal used for transmission by one transmitter of the radar system might consist of repeated sequences of random or pseudo-random binary values for one transmitter, e.g., (−1, −1, −1, −1, 1, 1, 1, −1, 1, 1, −1, −1, 1, −1, 1), although any sequence, including non-binary sequences and non-periodic sequences, could be used and different sequences would be used for different transmitters.

The transmitted signal at a radio frequency may be obtained by mixing a baseband signal with a local oscillator signal. At the receiver (receive pipeline), the received RF signal is down-converted by typical amplification, filtering, and mixing with in-phase and quadrature-phase components of an oscillator. The resulting complex signal after down-conversion is sampled and then correlated with different delays (time shifts) of replicas of the baseband signal to produce a complex-correlation value for each period of the binary sequence. A particular correlator that has a replica that is matched in delay to the time delay of the reflected RF signal from an object would produce a large magnitude complex correlator output. A single correlator will produce a sequence of correlator outputs that will be large if the reflected signal has a delay that matches the delay of the replica of the baseband transmitted signal. If there is a different velocity of the radar system as compared to an object causing a reflection, there will be a Doppler shift in the frequency of the reflected RF signal relative to the transmitted RF signal. A sequence of correlator outputs for one particular delay will have complex values that rotate at a rate related to the Doppler shift. Using a sequence of correlator outputs (also referred to as a scan), the Doppler shift may be estimated and thus the velocity of the object in the environment can be determined. The longer the sequence of correlator outputs used to estimate the Doppler frequency, the greater the accuracy and resolution of the estimation of the Doppler frequency, and thus, the greater the accuracy in estimating the velocity of the object.

There may be scans for different correlators that use replicas of the transmitted signal with different delays. Because there are multiple transmitters and multiple receivers, there may be correlators that process a received RF signal at each receiver that are matched to a particular transmitted RF signal by a particular transmitter. Each transmitter/receiver pair is called a "virtual radar" (a radar system preferably has 4 virtual radars, or more preferably 32 virtual radars, and most preferably 256 or more virtual radars). The receive pipeline of each receiver of the radar system will thus generate a sequence of correlator outputs (time slices) for each possible delay and for each virtual receiver/radar. This set of data is called a radar data cube (RDC). The delays are also called range bins. The part of the radar data cube for one point in the sequence of correlator outputs is called a time slice, and it contains one correlator output for each range bin and virtual receiver/radar combination. Storing the radar data cube can involve large amount of memory, as its size depends on the desired number of virtual radars (for example, 4-64 or more virtual radars), the desired number of range bins (for example, 100-500 or more range bins), and the desired number of time slices (for example, 200-3000 or more time slices).

The complex-valued digitized samples contained in a three-dimensional radar data cube may be processed, preferably by a processor established as a CMOS processor and coprocessor on a common/same semiconductor substrate, typically a silicon substrate. In one embodiment, the processor comprises fixed function and programmable CPUs and/or programmable logic controls (PLCs). Preferably, the system will be established with a radar system architecture (including, for example, analog RF circuitry for the radar, processor(s) for radar processing, memory module(s), and other associated components of the radar system) all on a common/same semiconductor substrate. The system may preferably incorporate additional processing capabilities (such as, for example, image processing of image data captured by one or more vehicle cameras such as by utilizing aspects of the systems described in U.S. Pat. Nos. 5,877,897; 5,796,094; 6,396,397; 6,690,268 and 5,550,677, which are hereby incorporated herein by reference in their entireties) within the common/same semiconductor substrate as well.

The ability of a continuous-wave radar system to distinguish multiple objects/targets is dependent upon the radar system's range, angle, and Doppler resolutions. Range resolution is limited by a radar's bandwidth (i.e., the chip rate in a phase modulated continuous wave radar), while angle resolution is limited by the size of the antenna array aperture. Meanwhile, increasing Doppler resolution only requires a longer scan. A high Doppler resolution is very valuable because no matter how close two objects or targets are to each other, as long as they have slightly differing radial velocity (their velocity towards or away from the radar system), they can be distinguished by a radar system with a high enough Doppler resolution. Consider a walking adult next to a walking child, where the adult is moving towards the radar system at 1.5 meters per second while the child is moving towards the radar system at 1.2 meters per second (ignoring how fast the radar system may be moving). If the Doppler resolution of the radar system is high enough, the radar system will be able to distinguish the two targets. However, if the radar system is only able to achieve Doppler resolutions of up to an exemplary 0.5 meters per second, the radar system will be unable to distinguish the two targets.

Preferably, the Doppler resolution is 0.1 meter per second (m/s) and more preferably less than 0.05 m/s.

FIG. 1 illustrates an exemplary radar system 100 configured for use in a vehicle 150. In an aspect of the present invention, a vehicle 150 may be an automobile, truck, or bus, etc. As illustrated in FIG. 1, the radar system 100 may comprise one or more transmitters and one or more receivers 104a-104d for a plurality of virtual radars, control and processing module 102 and indicator 106. Other configurations are also possible. FIG. 1 illustrates receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

Figure 2A:
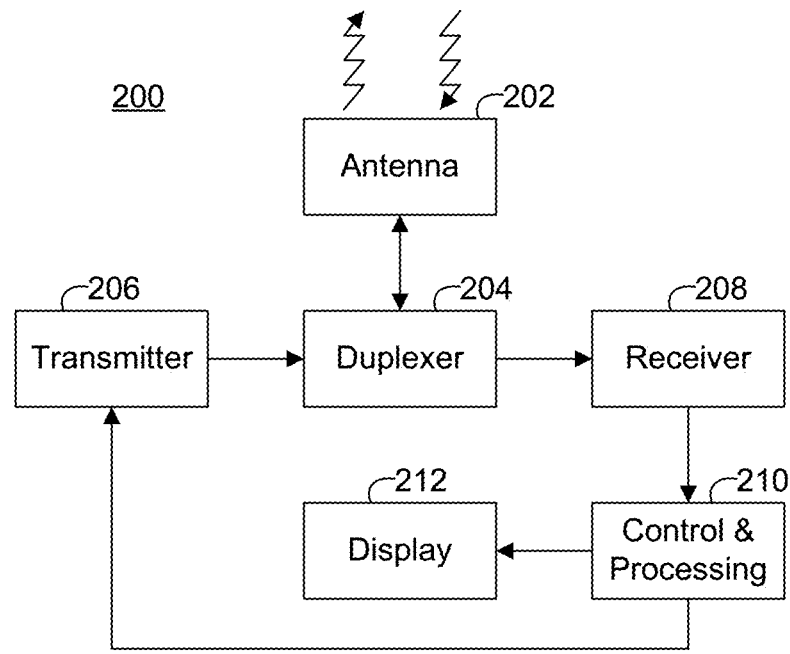
FIG. 2A and FIG. 2B are block diagrams of radar systems in accordance with the present invention.
Figure 2B:
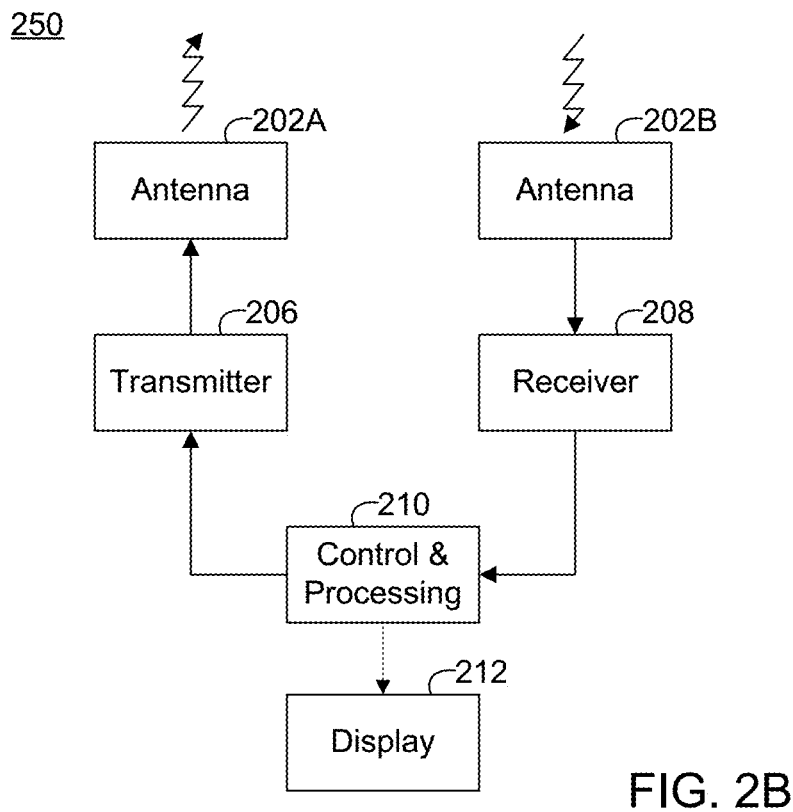

FIG. 2A illustrates an exemplary radar system 200 with an antenna 202 that is time-shared between a transmitter 206 and a receiver 208 via a duplexer 204. As also illustrated in FIG. 2A, output from the receiver 208 is received by a control and processing module 210 that processes the output from the receiver 208 to produce display data for the display 212. As discussed herein, the control and processing module 210 is also operable to produce a radar data output that is provided to other control units. The control and processing module 210 is also operable to control the transmitter 206. FIG. 2B illustrates an alternative exemplary radar system 250 with a pair of antennas 202a, 202b, a separate antenna 202a for the transmitter 206 and another antenna 202b for the receiver 208. While pulse radar systems may use shared or separate antennas, continuous-wave radars (discussed herein) will use separate antennas (for transmitting and receiving) because of their continuous operation.

The radar sensing system of the present invention may utilize aspects of the radar systems described in U.S. patent application Ser. No. 15/204,003, filed Jul. 7, 2016, now U.S. Pat. No. 9,575,160, and/or Ser. No. 15/204,002, filed Jul. 7, 2016, now U.S. Pat. No. 9,599,702, and/or U.S. provisional applications, Ser. No. 62/319,613, filed Apr. 7, 2016, Ser. No. 62/327,003, filed Apr. 25, 2016, Ser. No. 62/327,004, filed Apr. 25, 2016, Ser. No. 62/327,005, filed Apr. 25, 2016, Ser. No. 62/327,006, filed Apr. 25, 2016, Ser. No. 62/327,015, filed Apr. 25, 2016, Ser. No. 62/327,016, filed Apr. 25, 2016, Ser. No. 62/327,017, filed Apr. 25, 2016, and/or Ser. No. 62/327,018, filed Apr. 25, 2016, which are all hereby incorporated by reference herein in their entireties.

There are several types of radio frequency (RF) signals used in radar systems. One type of radar RF signal is known as a frequency-modulated continuous-waveform (FMCW). In an FMCW radar system, the transmitter of the radar system sends a continuous signal in which the frequency of the RF signal varies. This is sometimes called a chirp radar system. At the receiver a matched filter may be used to process the received RF signal. The output of the matched filter is a so-called "pulse-compressed" signal with a pulse duration inversely proportional to the bandwidth used in the chirp signal.

Figure 8:
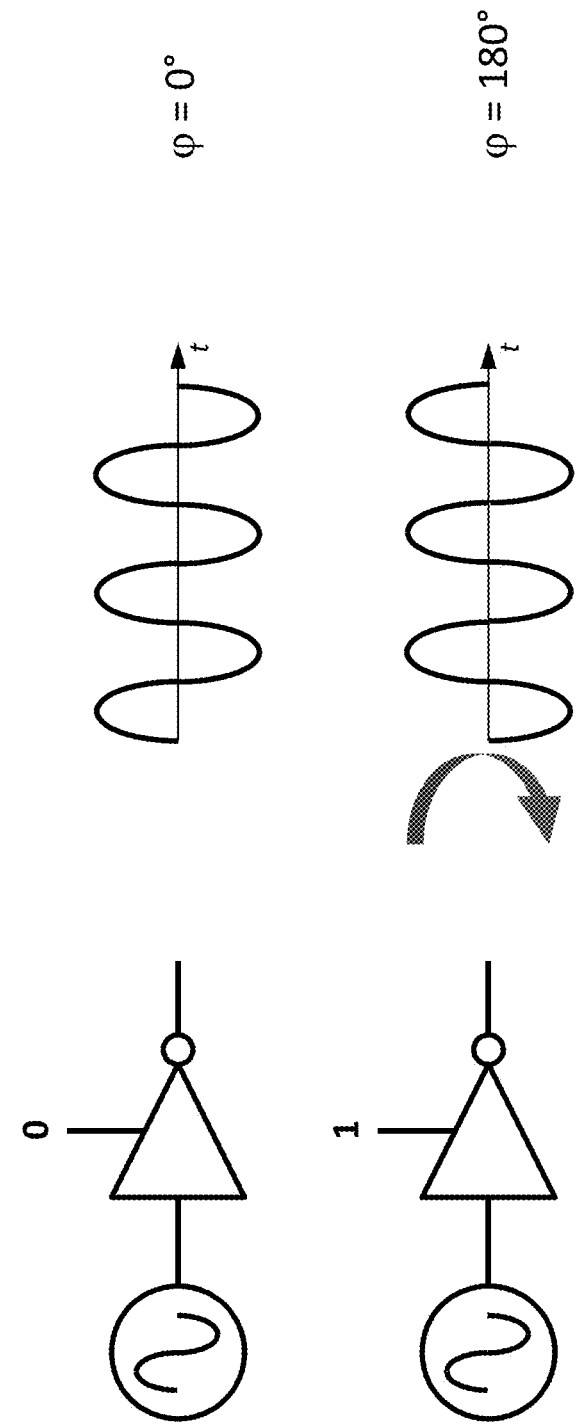
Figure 10:
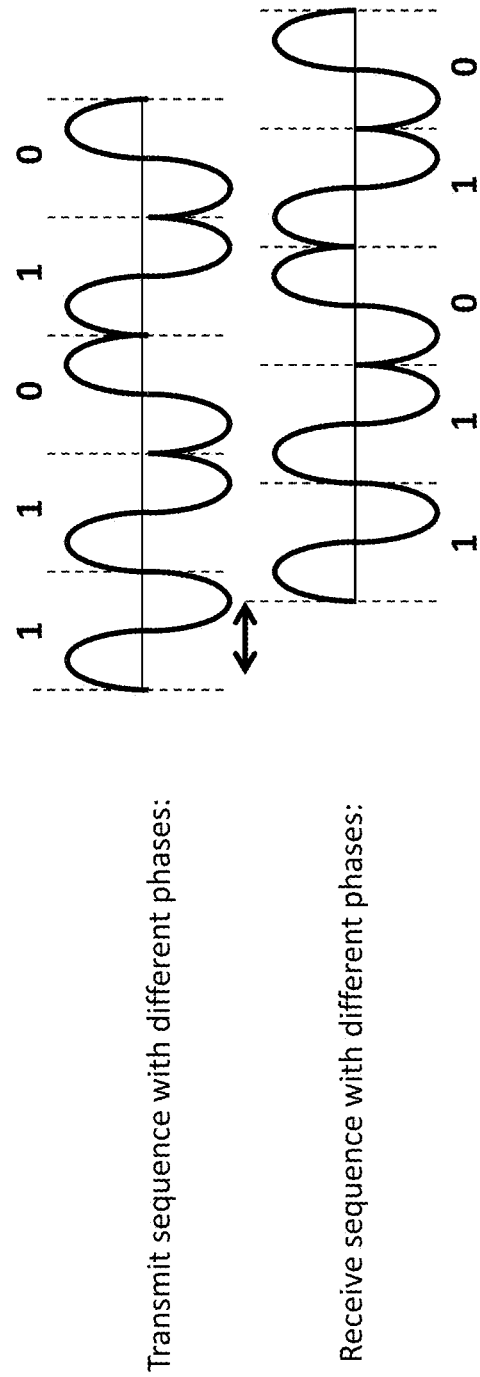

Another type of radar RF signal is known as a phase-modulated continuous-waveform (PMCW). For this type of RF signal, the phase of the transmitted RF signal is changed according to a certain pattern or code, sometimes called a spreading code, which is known at the radar receiver (see FIGS. 8-10). The faster the phase is changed, the wider the bandwidth of the transmitted RF signal. This is sometimes called spread-spectrum because the signal power is spread over a wide bandwidth. As illustrated in FIGS. 8-10, the pattern may be implemented as a pseudorandom binary code, where 1s and 0s indicate a positive or negative phase shift. As also illustrated in FIGS. 9 and 10, a phase shift does not always affect the waveform (e.g., a binary code sequence of 1, 1 or 0, 0 does not change the phase of the waveform for the second 1 or 0). In an aspect of the present invention, there may be different types of codes, with each transmitter of a radar system using a separate code. In other modes, each transmitter transmits with a single code that is modulated according to a Hadamard transform.

At the receiver, a matched filter is used that produces a so-called pulse compressed signal with time resolution proportional to the inverse bandwidth of the transmitted RF signal. Codes with good autocorrelation values are important in single transmitter, single receiver, phase-modulated continuous-wave radars.

Radars with a single transmitter and a single receiver can determine distance to a target but cannot determine a direction or an angle of a target from the radar sensor or system. To achieve angular information, either multiple transmitters or multiple receivers or both are needed. The larger the number of transmitters and receivers, the better the resolution possible. A system with multiple transmitters and multiple receivers is also called a multiple-input, multiple-output or MIMO system. With MIMO radar systems, the receive pipeline for each receiver of the radar system can have a matched filter for each of the transmitter codes. As discussed herein, a quantity of virtual radars is defined by the quantity of transmitters and physical receivers (a quantity of transmitters times a quantity of physical receivers equals a quantity of virtual radars). A receiver may be referred to as a virtual receiver. A radar system with only a single transmitter will have virtual receivers that are physical receivers, but may still be referred to as virtual receivers.

One type of radar system transmits the same type of signal continuously. The signal might be a frequency-modulated continuous-wave (FMCW) type of waveform that sweeps a continuous-wave (CW) signal in frequency across some range of frequencies. Mixing (multiplying) the reflected wave from a target with a replica of the transmitted signal results in a CW signal with a frequency that represents the distance between the radar transmitter/receiver and the target. By sweeping up in frequency and then down in frequency the Doppler frequency can also be determined. Phase-modulated continuous-wave (PMCW) radar systems on the other hand transmit an RF signal in which a phase is modulated (e.g., with two values 0 and $-\pi$). For a single transmitter, a sequence of phase values—sometimes called a spreading code—that has good autocorrelation properties is required so that ghost targets are minimized. The rate at which the phase is modulated determines the bandwidth of the transmitted RF signal.

An exemplary radar system determines the range of an object or the distance to an object by determining how long it takes an echo of a transmitted RF signal to be heard back at the receive pipeline of the radar system. From this measured time delay and knowing that the electromagnetic RF signals travel at the speed of light (or ultrasonic signals traveling at the speed of sound), the distance can be determined. A typical way of determining the time delay is by correlating a received RF signal with multiple time-delayed replicas of the transmitted RF signal (via the use of range bins, as discussed herein). When a particular time-delayed replica corresponding to a particular range bin correlates highly with the received RF signal (which results in a larger amplitude signal as compared to a RF signal that does not correlate highly with the received RF signal), it is an indication of the time delay (or equivalent range) for the transmitted RF signal that is received after reflecting from an object. Because there can be multiple objects in the environment, there will be multiple time delays for which there will be a high correlation. While a virtual receiver/radar could correlate the received RF signal with all possible delays, generally there is a finite set of delays with which the virtual receiver/radar will correlate (that is, the range bins).

The ranges corresponding to the different time delays generated by replica signals are the above mentioned range bins. They may also be known as "range gates." The accuracy of range determination increases as the bandwidth of the transmitted RF signal increases (as the rate at which the phase of the signal changes) and as the number of time-delay replicas increase. A receiver that uses a matched filter may generate correlation values for all possible time delays (each range bin). This matched filter receiver will still have a range resolution that depends on the bandwidth of the transmitted signal.

A radar system can determine the velocity of an object by measuring the frequency offset between the transmitted RF signal and the received RF signal. The RF signal reflecting from a moving object will have a frequency shift relative to the transmitted RF signal. This is called the Doppler effect and the frequency shift is called the Doppler shift. A noticeable exemplary Doppler effect may be experienced with regards to trains passing through a road crossing where the frequency of the sound will go down once the train has passed the road crossing. The RF signal reflected off an object moving toward the radar system will have a higher frequency than the transmitted RF signal, and an object moving away will have a lower frequency. If the radar system is also moving, then it is the relative velocity between the radar system and the object that will determine the amount of frequency shift. Thus, measuring the frequency shift will determine the relative velocity of an object in the environment. The time duration of the transmitted RF signal will determine the accuracy or resolution of the Doppler frequency.

The correlation of replicas of the transmitted RF signal modified at different time delays and different frequency shifts is called the ambiguity function. It is the correlation at different delays and different frequency shifts which are an indication of the range and velocity of the objects in the environment. A virtual radar calculating the ambiguity function can estimate the range and velocity of objects in the environment.

Because there can be multiple objects in the environment with different ranges and different velocities, there may be multiple reflections with different delays and different frequency shifts. It is important in many applications to measure the frequency shift for different objects at different ranges to determine the velocity of individual objects. Each object in a given range will generate a frequency shift that should be estimated.

The frequency shift of a received signal at a particular range bin can be measured by looking at the sequence of phase values of the correlator output of the receive pipeline over a set of correlations. The phase shift $\Delta\phi$ between two consecutive correlator outputs that are separated in time $\Delta T$ will correspond to a frequency shift, $\Delta f$, that can be determined as $\Delta f = \Delta\phi/\Delta T$. The longer the time duration of the transmitted signal, the more accurate the determination of frequency shift of an object at a particular range bin.

Figure 11:
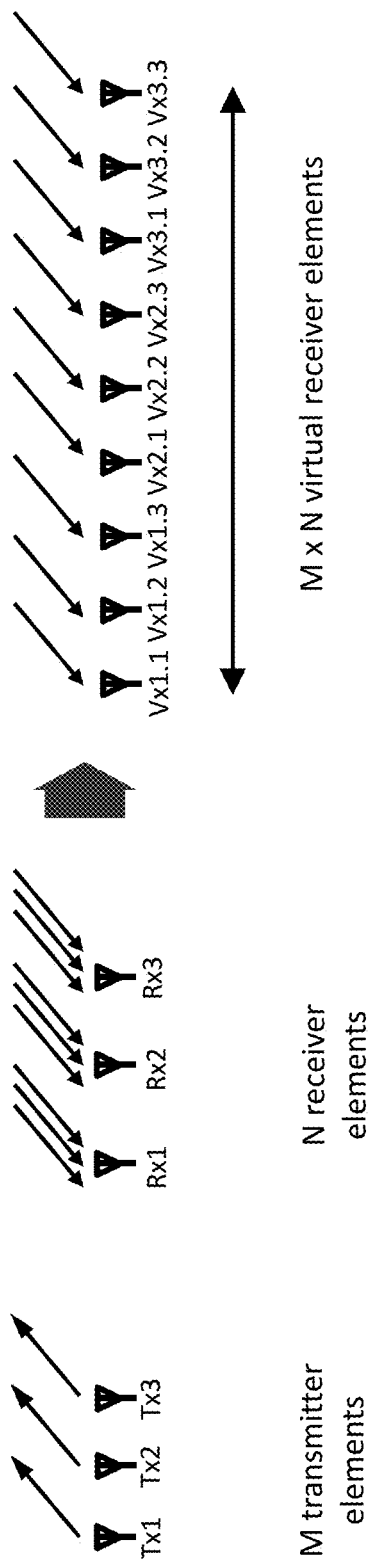
FIG. 11 illustrates capabilities of a multiple transmitter and multiple receiver radar system.

While the description above is focused on a single transmitter-receiver pair, if there are N transmitters (TxN) and N receivers (RxN), there will be TxN×RxN virtual radars, one for each transmitter-receiver pair. For example, a radar system with eight transmitters and eight receivers will have 64 pairs or 64 virtual radars (with 64 virtual receivers). As illustrated in FIG. 11, when three transmitters (Tx1, Tx2, Tx3) are being received by three receivers (Rx1, Rx2, Rx3), each of the receivers is receiving the transmission from each of the transmitters. Each of the receivers is receiving the sum of all three of the transmissions at the same time. Each receiver can attempt to determine the range and Doppler of objects by correlating with delayed replicas of the signal from one of the transmitters. The physical receivers may then be "divided" into three separate virtual receivers, each virtual receiver correlating with a replica of one of the transmitted signals. In a preferred radar system of the present invention, there are 1-4 transmitters and 4-8 receivers, or more preferably 4-8 transmitters and 8-16 receivers, and most preferably 16 or more transmitters and 16-64 or more receivers.

Figure 3:
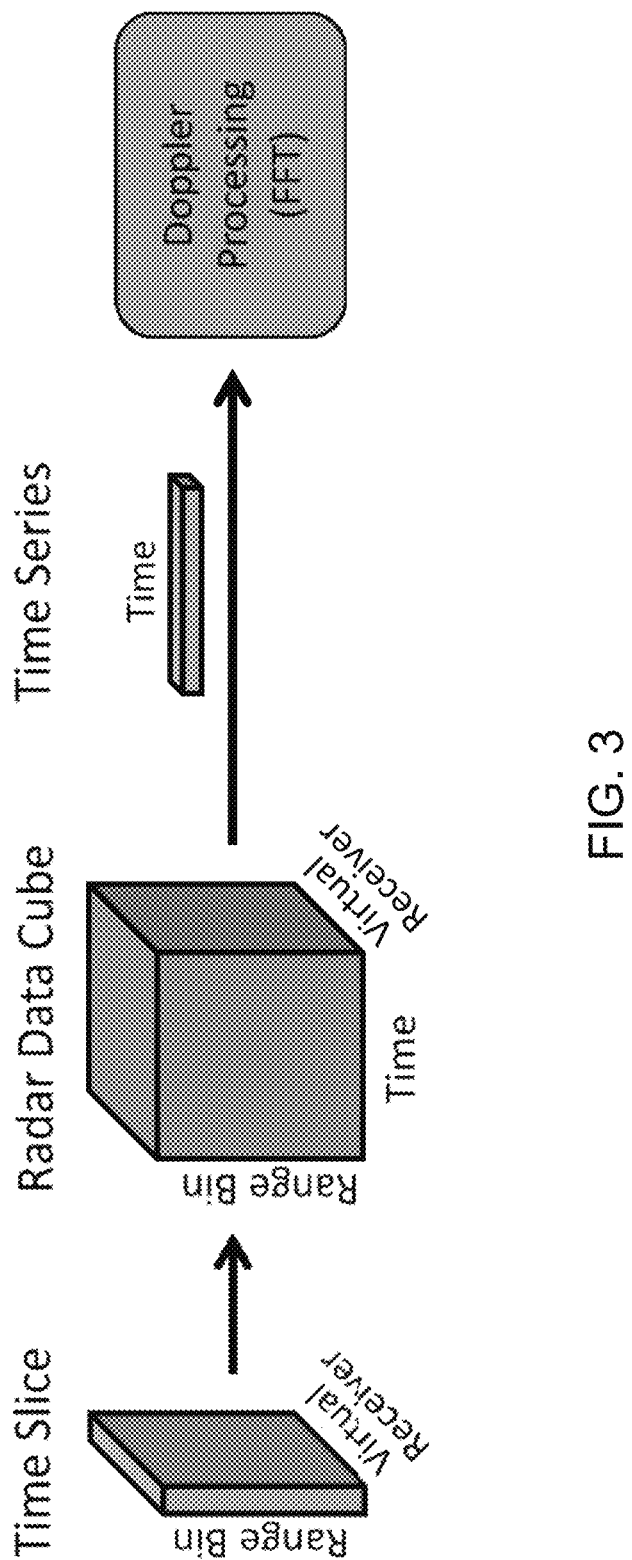
FIG. 3 is an block diagram illustrating a flow of information through a radar receiver of the radar system of FIGS. 2A and 2B.

Collecting and storing all the information to determine the range and velocity of each object corresponding to each virtual receiver requires significant memory resources. The required memory resources necessary to achieve sufficient Doppler resolution may run into the tens of megabytes to a 100 megabytes or more. For example, the amount of memory necessary to store the data for a single scan of 1000 time slices from 64 virtual radars when that scan accumulates samples across 100 range bins for the 64 virtual radars would be more than 25 megabytes (see FIG. 3). In accordance with an aspect of the present invention, there are preferably 100 range bins, more preferably 200 range bins, and most preferably 500 range bins in each time slice.

Figure 4:
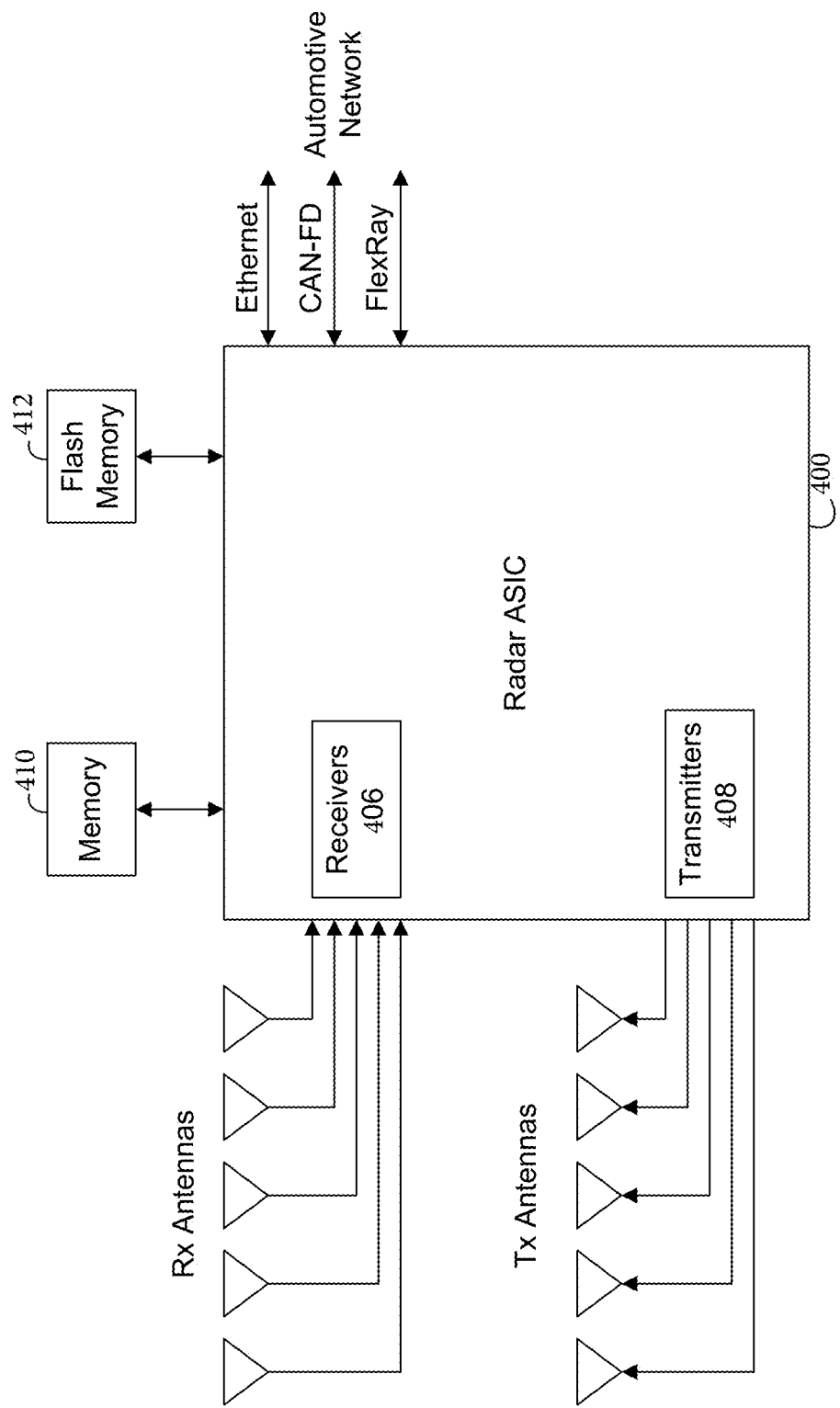
FIG. 4 is a block diagram illustrating a radar system with a plurality of receivers and a plurality of transmitters in accordance with the present invention.

FIG. 4 illustrates an exemplary phase-modulated continuous-wave radar system 400. As illustrated in FIG. 4, the radar system 400 comprises a plurality of receivers and their respective antennas 406 and a plurality of transmitters and their respective antennas 408. The radar system 400 also includes a flash memory 412, and optionally a random access memory 410. The random access memory 410, for example, an external DRAM, may be used to store radar data cube(s) instead of using the limited internal (on-chip) memory (e.g., SRAM), and may also be used to store selected range bins from a greater number of radar data cubes for concatenating for micro-Doppler processing. The radar system also includes a variety of interconnections to an automotive network, e.g., Ethernet, CAN-FD, and Flexray.

Radar systems have the ability to measure a target's range and angle (azimuth and elevation) and Doppler velocity (range rate of change). The primary metrics in each of these measurements are resolution and accuracy. Resolution is particularly important because it allows the radar system to distinguish (resolve) targets that are closely spaced in range, angle, or Doppler velocity. Range resolution is limited by the radar's bandwidth—chip rate in a PMCW radar. Angle resolution is limited by the size of the antenna array aperture. It is quite common that two neighboring targets cannot be resolved in range or in angle due to physical limitations of the radar. Increased Doppler resolution, on the other hand, only requires a longer scan. No matter how close two targets are to each other, as long as they have slightly differing radial velocity, they can be distinguished by a radar with a sufficiently high enough Doppler resolution. Two examples are (1) a pedestrian walking out into the roadway from between two cars parked along the side of the road, and (2) a motorcycle driving alongside a truck. The radar system of the present invention provides greater sensitivity (to enable the detection of pedestrians or wooden poles for parking) and enhanced resolution in range, azimuth, and elevation.

The radar system provides enhanced target discrimination, while providing a cost effective device that provides scalability.

The PMCW radar system provides fully digital modulation, with features becoming all digital vs analog. The RF is simpler and smaller, with about a 10× advantage in size over FMCW systems. The radar system provides more area for digital processing, and provides improved range resolution, enhanced range isolation—very small targets next to large targets, enhanced interference mitigation architecture (it can handle an order of magnitude more interferers than FMCW), and enhanced isolation from interfering radars. The radar system provides true MIMO processing, which enables unmatched angular and super resolution. The PMCW radar system is also naturally resistant to jamming. The above described PMCW radar system when comprising multiple transmitters and multiple receivers in a multiple-input-multiple-output (MIMO) system is useful in a radar system where the receivers and transmitters need to receive and transmit simultaneously.

Figure 6:
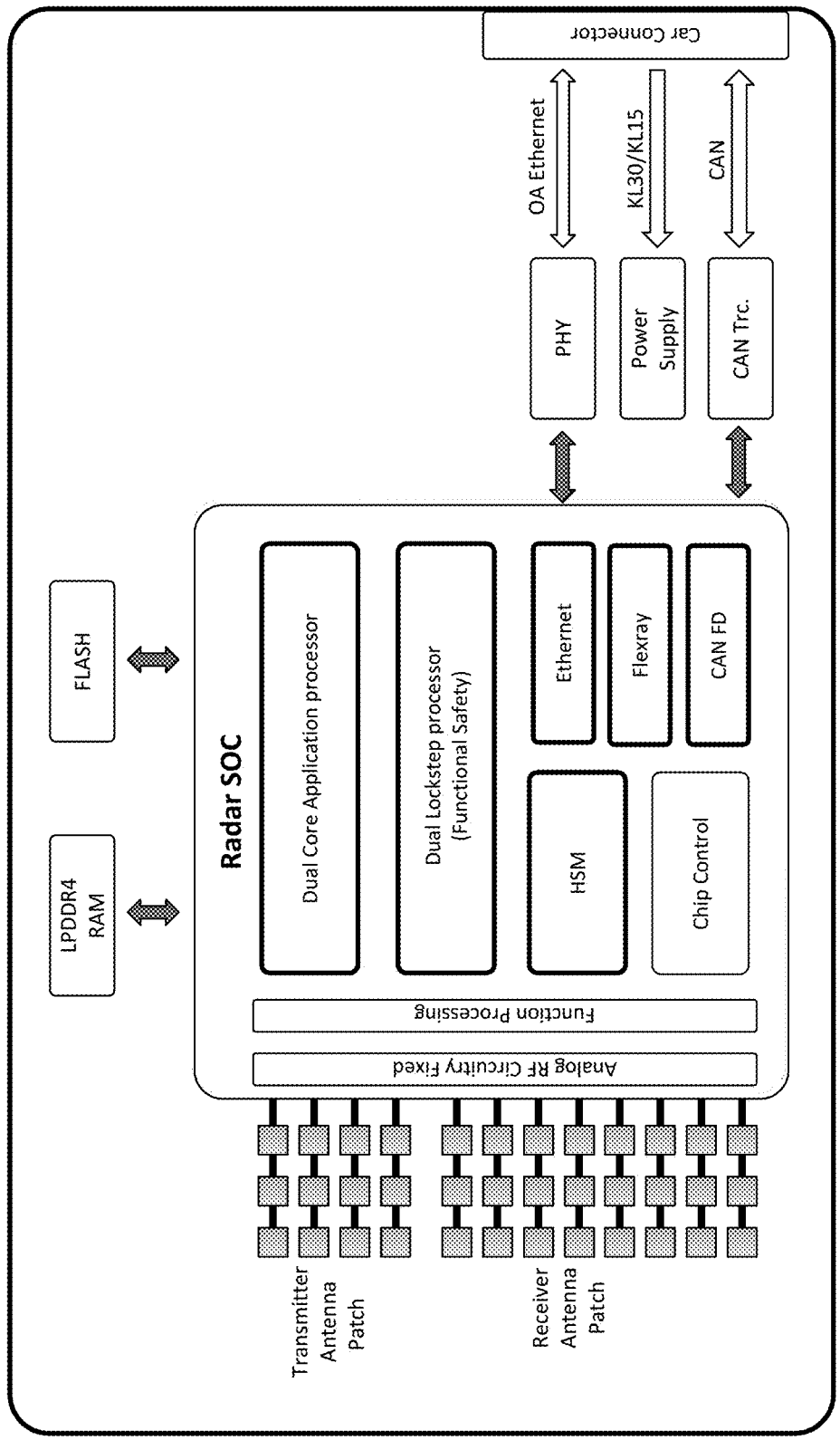
FIG. 6 is a block diagram illustrating another radar system with a plurality of receivers and a plurality of transmitters in accordance with the present invention.
Figure 7:
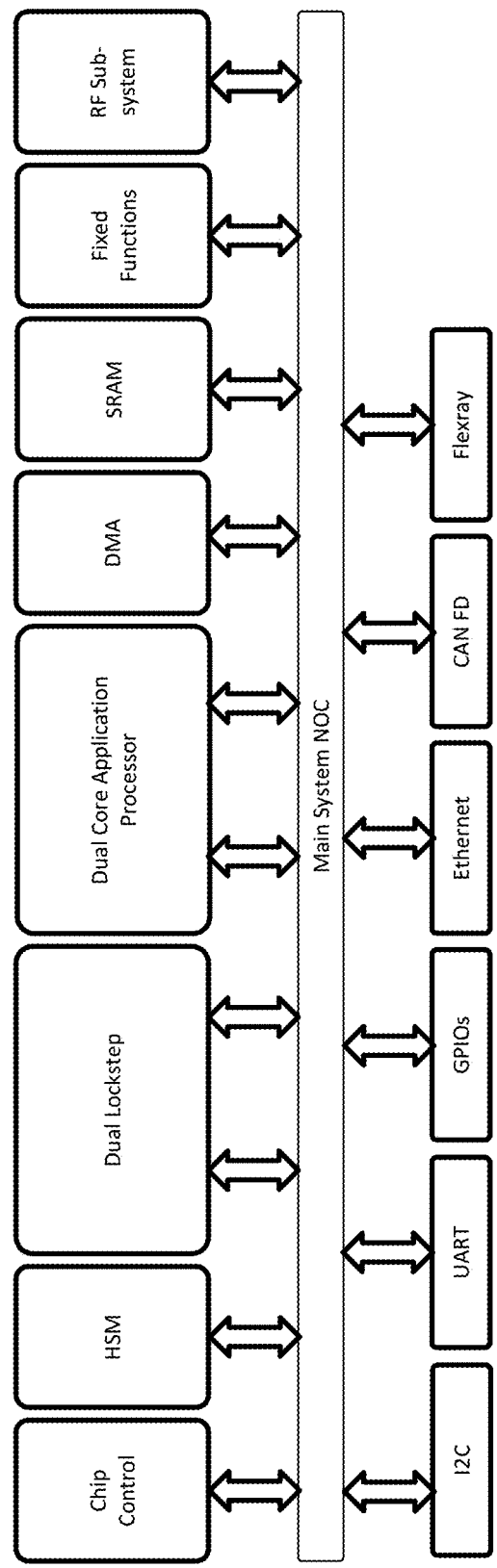
FIG. 7 is a block diagram of an exemplary system on a chip architecture for the radar system of the present invention.

FIG. 6 illustrates another exemplary radar system of the present invention. Similar to the radar system 400 of FIG. 4, the radar system of FIG. 6 comprises a plurality of transmitter and receiver antennas. The radar system of FIG. 6 also includes RAM and flash memories, as well as interconnections to the automobile. FIG. 7 illustrates an exemplary system on chip architecture for the radar system of FIG. 6.

Figure 12:
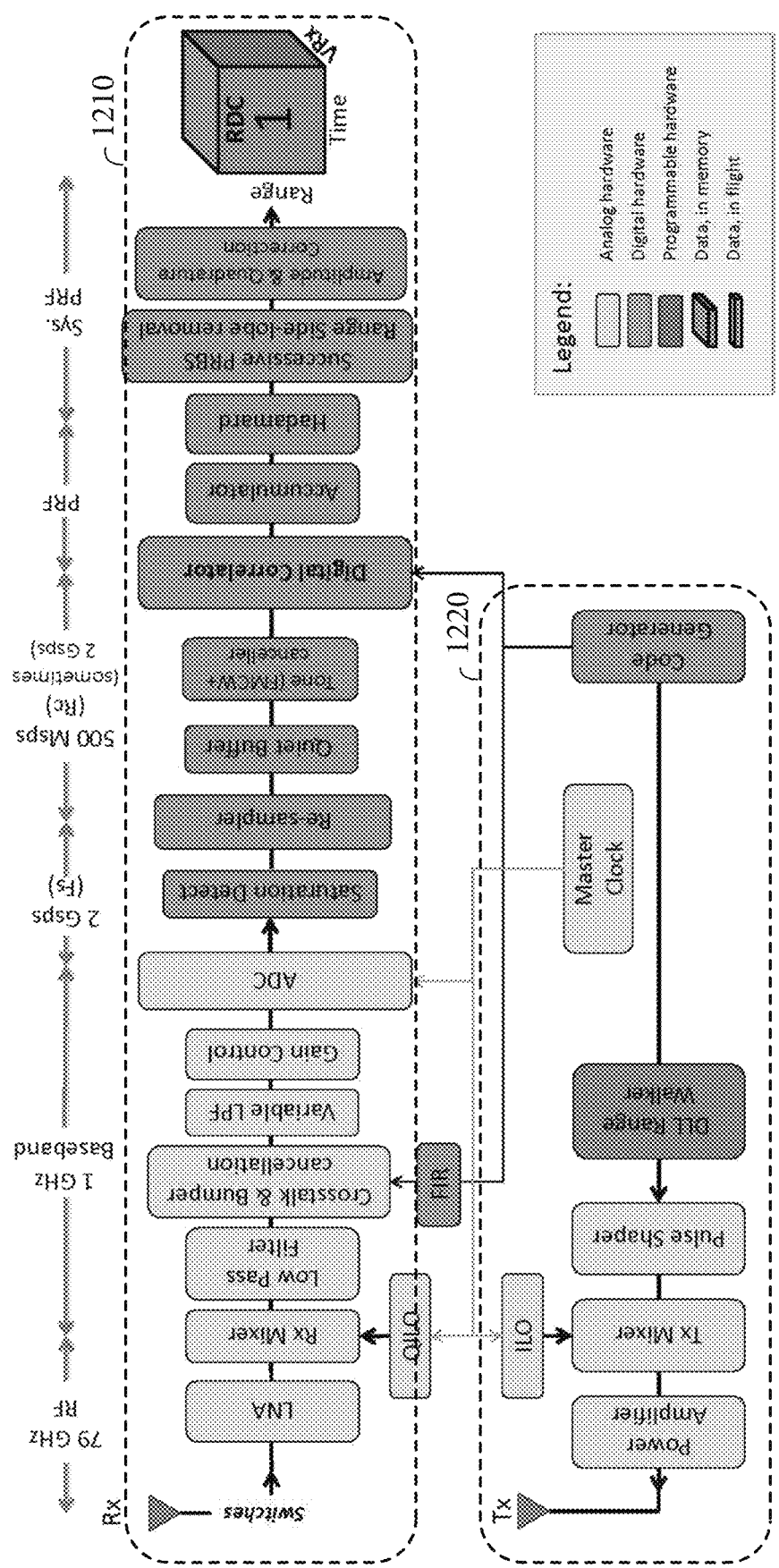
FIG. 12 is a block diagram of an exemplary receive pipeline and transmit pipeline for the radar system of the present invention.

FIG. 12 illustrates an exemplary receive pipeline 1210 and an exemplary transmit pipeline 1202 for a radar system of the present invention. As illustrated in FIG. 12, a code generator outputs a code that is used to form a baseband signal that is upconverted to an RF signal by an RF upconverter followed by a transmission antenna. As illustrated in FIG. 12, the received RF signal at a receiver antenna is down-converted by the receive pipeline 1210's amplifiers, filters, and mixers and converted into a complex baseband signal. The resulting signal after down-conversion is sampled by an analog-to-digital converter (ADC) and correlated by a correlator of the receive pipeline 1210 with different delays (time shifts) of replicas of the transmitted sequence to produce a complex correlation value for each period of the binary sequence. A particular correlator that has a replica that is matched in delay to the time delay of the reflected RF signal from an object would produce a large magnitude complex correlator output. A single correlator will produce a sequence of correlator outputs that will be large if the reflected RF signal has a delay that matches the delay of the replica of the baseband transmitted signal. If there is a difference between a velocity of the radar system and a velocity of the object causing the reflection, there will be a Doppler shift in the frequency of the reflected RF signal relative to the transmitted RF signal. A sequence of correlator outputs for one particular delay will have complex values that rotate at a rate related to the Doppler shift. Using a sequence of correlator outputs (also referred to as a scan), the Doppler shift may be estimated and thus the velocity of the object in the environment. The longer the sequence of correlator outputs used to estimate the Doppler frequency, the greater the accuracy and resolution of the estimation of the Doppler frequency, and thus the velocity of the object.

There may be scans for different correlators that use replicas of the transmitted RF signal with different delays. Because there are multiple transmitters and multiple receivers (virtual radars), there may be correlators that process a received RF signal at each receiver that are matched to a particular transmitted signal by a particular transmitter. The receive pipeline of 1210 for each receiver of the radar system will thus generate a sequence of correlator outputs for each possible delay and for each virtual radar. This set of data is called a radar data cube (RDC) made up of individual time slices.

Figure 5:
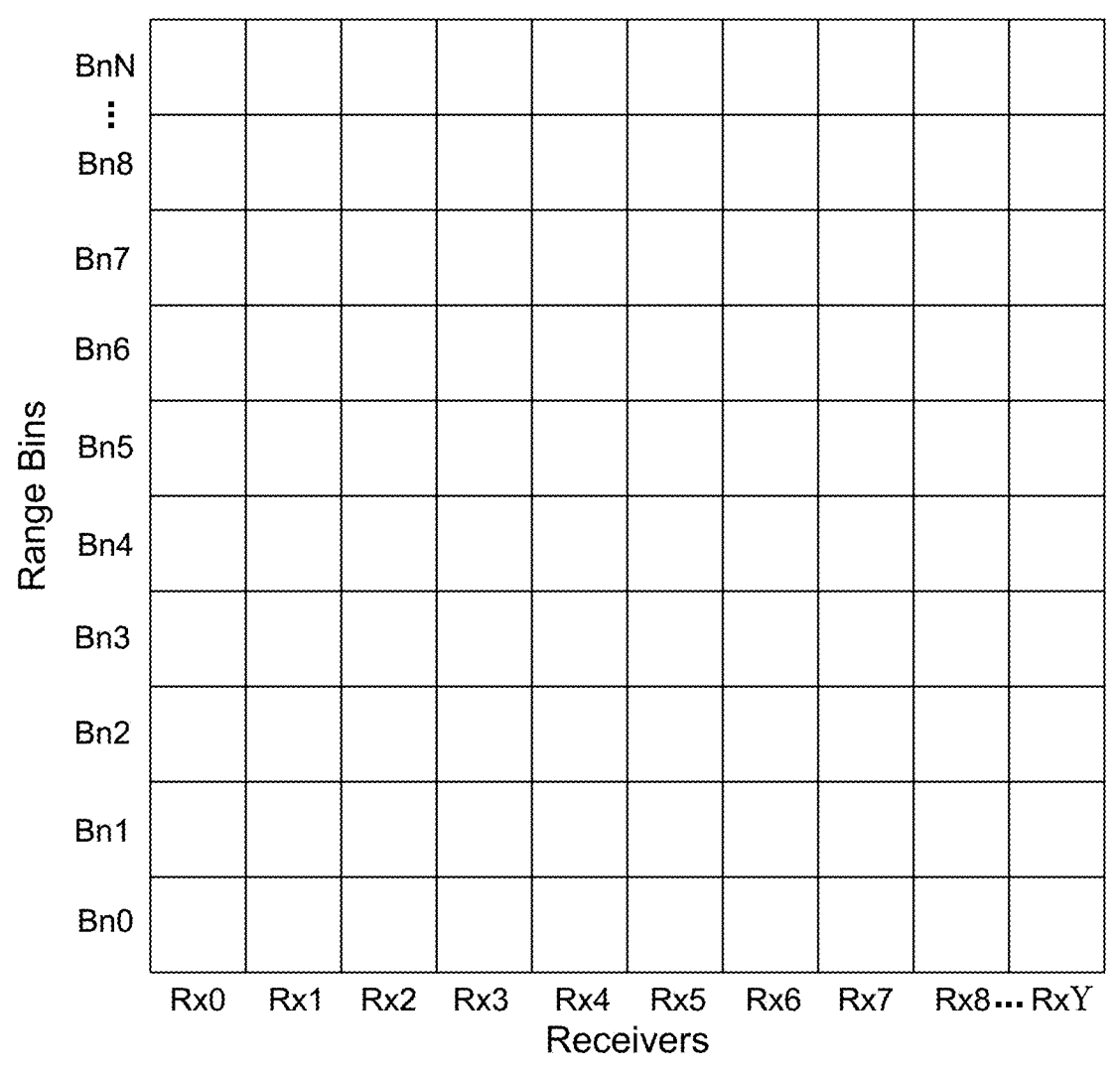

In accordance with an aspect of the present invention, the receive pipeline 1210 comprises a correlator block, where the correlator block comprises a bank of correlators with a correlator for every range bin and every virtual radar combination. In other words, a two-dimensional bank of correlators similar to the two-dimensional array of range bins illustrated in FIG. 5. Optionally, the bank of correlators may be smaller than the array of range bins. For example, there may be one correlator for each physical receiver, such that each correlator generates an output for each virtual receiver of the corresponding physical receiver. Optionally, the entire receive pipeline 1210 after the receiver antenna(s) may be implemented on a single integrated chip. Optionally, even the antenna may be implemented on the same single integrated chip as the rest of the receive pipeline 1210. In accordance with another aspect of the present invention, the correlator functionality may be implemented in a receive pipeline. Optionally, the correlator functionality may be implemented in a processor. Optionally, portions of the receive pipeline may be implemented in a processor.

Pulsed Pmcw Radars for Improved Object/Target Detection:

Phase-modulated continuous-wave (PMCW) radars using pseudorandom binary sequence (PRBS) codes, almost perfect autocorrelation sequences (APAS), Golay codes, as well as many other codes, all have range sidelobes that limit the dynamic range of the radar. For PMCW radar systems that utilize PRBS codes, the range sidelobes can be shown to be $10*\log(Ts*Rc*Vr)$ dB smaller than the peak correlation, or $10*\log(\text{total chips}*Vr)$ dB, where Vr is the number of virtual receivers, Ts is the scan time, Rc is the chip rate, and the product represents the number of chips processed in the correlator. For a typical radar system with a scan time of 10 ms, a 1 GHz chip rate, and 16 virtual radars (Vr), this represents a sidelobe level of $10*\log(160e6)$ or 82 dB. Many applications for automotive radar require 90-105 dB of dynamic range between the largest to smallest targets. As an example, consider an automobile, such as a truck at a range of 10 meters with a 40 dBsm RCS and a motorcycle at a range of 250 meters with a 0 dBsm RCS. The difference in the signal strength from these objects assuming a free space path loss (in each direction) results in the truck having a stronger signal than the motorcycle (e.g., $40*\log(250/10)+(40-0)=95$ dB). This implies that the sidelobes due to the truck at 10 meters would make it difficult to detect the motorcycle at 250 meters. Another consideration is that the largest target typically detected is often self-interference from a bumper or antenna coupling. This could add another 60 dB of dynamic range requirement if not handled properly.

Exemplary methods may be used to cancel out the signal or reduce the sidelobes of the targets, but all of these rely on an accurate measurement of: the distance to the target with sub-range bin accuracy, the phase of the target to within less than 1 degree, and the amplitude of the target. Unfortunately, all of these values are related to the SNR of the target and might not be able to cancel out properly without highly accurate measurements of these three parameters. In addition, the transfer function of the channel must be accurately known or determined to remove the signal or to remove the sidelobes directly. The channel transfer function is changing with the temperature of the sensing device (among other factors), making it difficult to estimate the "what" and "how much" to cancel out in order to remove the signal from the near object. Beyond the channel transfer function, there are also non-linearities that need consideration. These include second and third harmonics, phase pulling of the transmitted or received RF signals, mixer issues, spectral emission mask signal reduction, and a sundry of other non-linearities that are common in analog blocks that can be 20 to 30 dBc down. Some of these require sampling at significantly higher frequencies so that they can be resolved.

Exemplary embodiments of the present invention provide methods and a system for achieving better performance in a radar system when there is a near object and a far target. Better detectability is accomplished for the far target in the presence of a near target by altering the transmission power as a function of time. Such embodiments provide compensation for the mismatched attenuations between the near and far targets (without compensation, the signals reflected off of near targets have a higher signal strength than the signals reflected off of far targets).

In an aspect of the present invention, an exemplary transmitter transmits a radio frequency (RF) signal with variable transmission power or a variable duty cycle. The variable power is such that the RF signal reflected from a near target will have a lower transmitted power than the RF signal reflected from a more distant target at a given time. That is, a large amplitude RF signal is initially transmitted. Then the transmitted power is decreased as a function of time. By the time the large amplitude RF signal is reflected off the more distant target and received, the signal strength of the reflected RF signal received from the near target has decreased because the transmitted power causing the reflection from the near target has also decreased. As such, the amount of interference created by the near target is reduced relative to the amount of interference that would be present for a constant power transmitter. The signal strength of the reflected RF signal may be adapted by actually changing the amplitude of the transmitted RF signal or by changing a duty cycle of the transmitted RF signal. The transmission power level will start at some high level and then decrease over time until the transmission power level reaches some minimum value, at which time the process will repeat. As an example, a target or object with a cross-sectional area (RCS) corresponding to the back of an 18-wheeler is about 6.6 square meters (or 8.2 dBsm). At a distance of 25 meters, this would produce a signal level proportional to $6.58/(25)^4$), which corresponds to a distance to the fourth power loss model (free space path low in each direction). A correlation over a time duration of 10 ms with a bandwidth of 500 MHz (which results in 5,000,000 chips) with a single receiver would produce sidelobes that are about only 33 dB lower than the peak correlation ($10*\frac{1}{2}*\log_{10}(5,000,000)$). This is true for PRBS code sequences because for random sequences, the sidelobes are lower than the peak by the square root of the length of the sequence. Thus, the factor of ½ outside the logarithm. On the other hand, a target with a much smaller radar cross section (e.g., 1 dBsm or 0 dBsm) and at a greater distance (e.g. 300 m), would produce a peak correlation proportional to $1/(2*300)^4$, which is 42 dB lower than the sidelobes of an RF signal received from a nearer target. As a result, the more distant target would not be detectable in the presence of the closer target.

Figure 18:
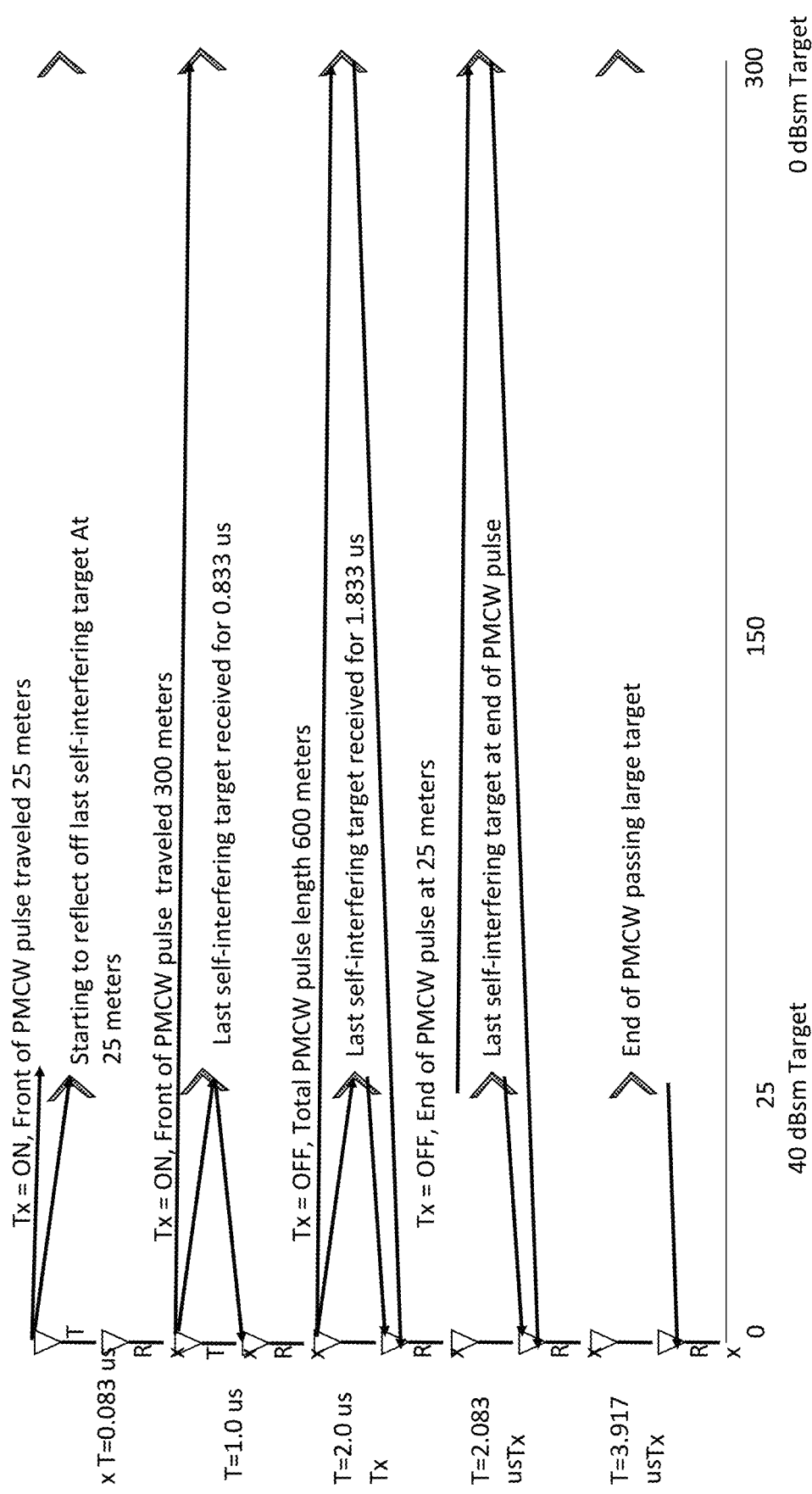
FIG. 18 is a flow diagram illustrating the effect of a discontinuous transmission that is reflected from two objects at different distances in accordance with the present invention.

For example, consider a radar system attempting to detect a motorcycle (with a RCS of 0 dBsm) out to a range of 300 meters, in the presence of a strong target (with a RCS of 40 dBsm) at a range of 25 meters, and with a 10 ms scan (500 Mcps chip rate). The reflected RF signal off of the motorcycle would be approximately 83 dB smaller than the reflected RF signal off of the strong target. The sidelobes due to the strong target would be only 33 dB below the peak signal level and would be about 50 dB stronger than the peak signal of the motorcycle's reflected RF signal. Thus, the strong target would effectively hide any small target signals at a range of 300 meters. Targets with an RCS greater than 16 dBsm would be detectable with a 50% probability, but such would effectively reduce the effective range of the radar system to approximately 40% of the range for the smallest targets, or a range of 120 meters. To alleviate this, an exemplary 50% duty cycle pulse for 4.0 μs (transmitter ON for 2.0 μs, and OFF for 2.0 μs) is illustrated in FIG. 18. In an aspect of the present invention, the receiver may sample the down-converted signal during the full cycle. From time T=0.167 μs to T (25 meters*2=50 meters→167 ns) 2.167 μs, the reflected RF signal contains large amplitude target signals from near targets/objects. From T=2.167 till T=−4.0 μs, the received signal contains reflected RF signals from near targets with amplitudes that aren't large enough to interfere with more distant targets. The power-on target is only a portion of the duty cycle, and hence reduces the link budget of the system by 10*log(1.833/4.000) or −3.4 dB. This will reduce the effective range of the radar to 82% of the range or ~246 meters. This is a significantly better trade off.

Figure 13:
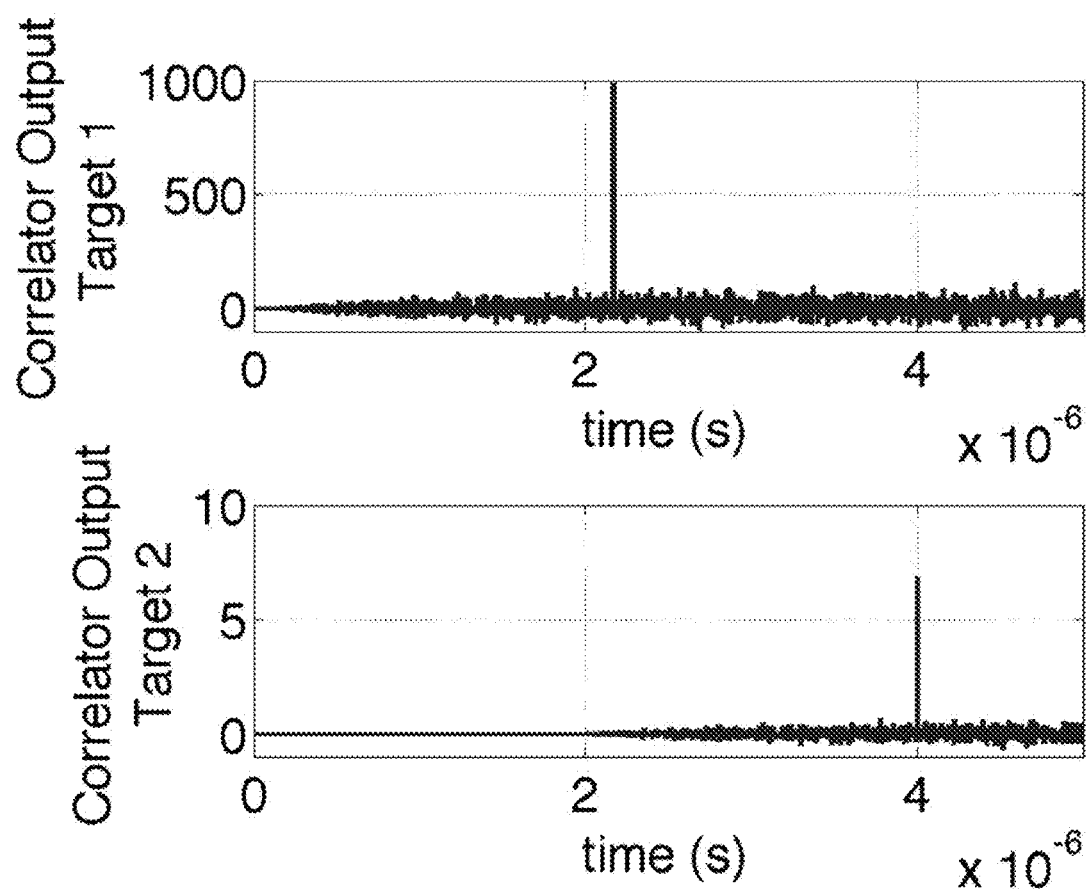
FIG. 13 is a pair of graphs illustrating the output of correlators with delays of the replica for two objects with continuous transmission.
Figure 14:
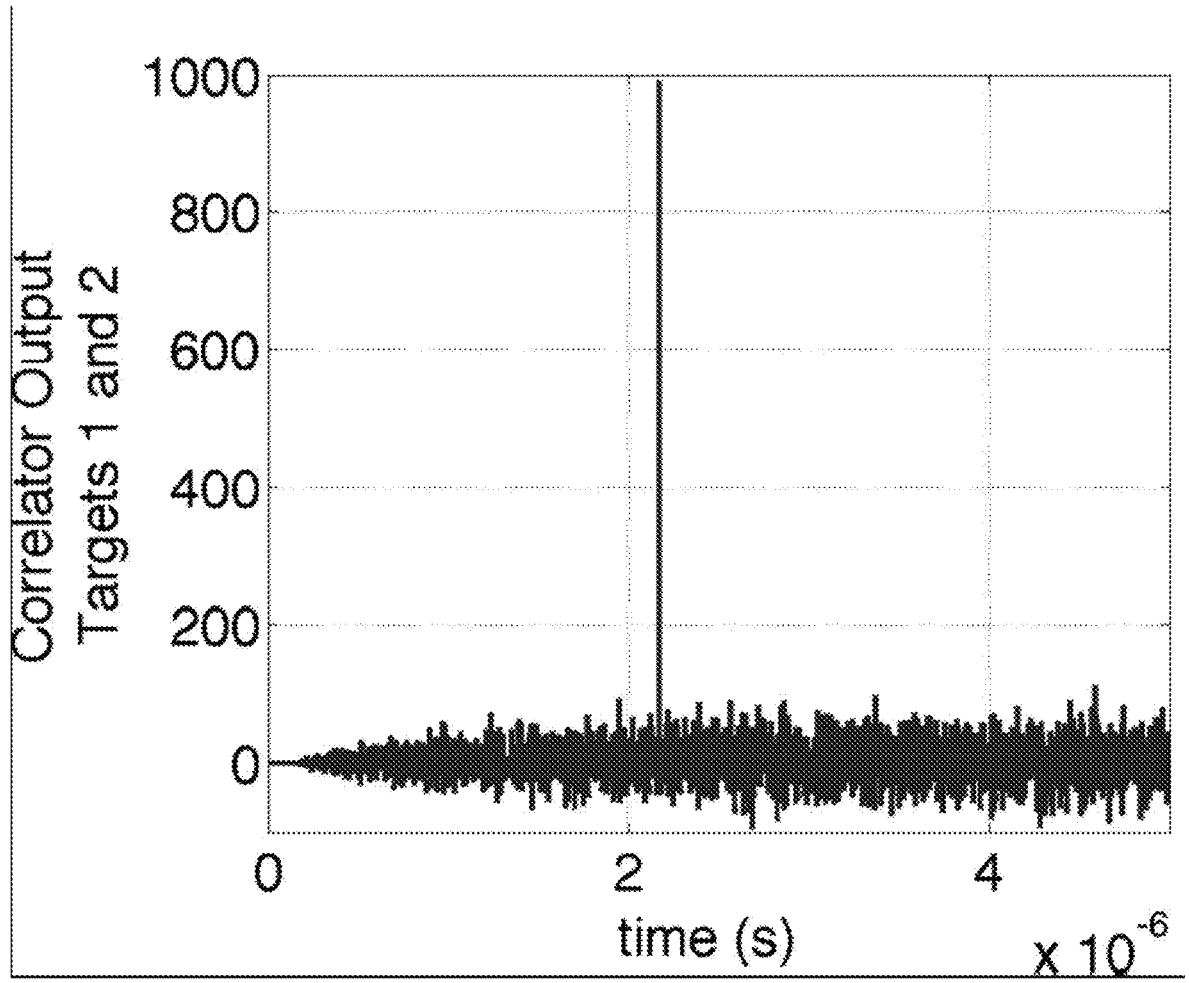
FIG. 14 is a graph illustrating the correlator outputs for total signal strength from the sum of the outputs from FIG. 13.

FIG. 13 is a graph illustrating the output of correlators with delays of the replica ranging from targets at 0 meters to targets at 360 meters. The assumptions made to generate the filter output include the transmitter transmitting a continuous signal with constant power. The receiver correlates the received with delayed replicas of the transmitted signal corresponding to the first 1000 chips (2 ms) of the transmitted signal for delays that range from a target at 0 meters to a target at 360 meters. In other words, FIG. 13 is a plot of the output of a matched filter output which is matched to the first 1000 chips (starting at time 0). Target one is at a range of 25 meters, while target two is at a range of 300 meters. Here the correlation is over a collection of 10,000 chips, at a chip rate of 500 Mcps, collected over 20 μs. Target one (a near target) will have 3 dB higher amplitude than target two (a more distant target). The output due to the near target is illustrated in the top plot which has been normalized to have a peak output of 1000. Here the phase of the reflected signal is assumed to be 0. The output due to the farther target (with the same normalization) is illustrated in the bottom plot. The actual output would be the sum of the two. These are not plotted on the same scale. The output due to the more distant target would not be visible in the scale that would be reasonable for the nearer target. The peak amplitude of the more distant target would not be detectable given the strength of the near target. The sidelobes of the near target have a root mean square value of approximately 33 (on the normalized scale), whereas the peak value of the far target is about 7 (on the normalized scale). Thus, the peak of the far target is much below the sidelobes of the near target. FIG. 14 is a graph illustrating the correlator output due to the sum of the two signals. This is what would actually be observed. Here the more distant target is not detectable because of the strengths of the sidelobes of the near target.

Figure 19:
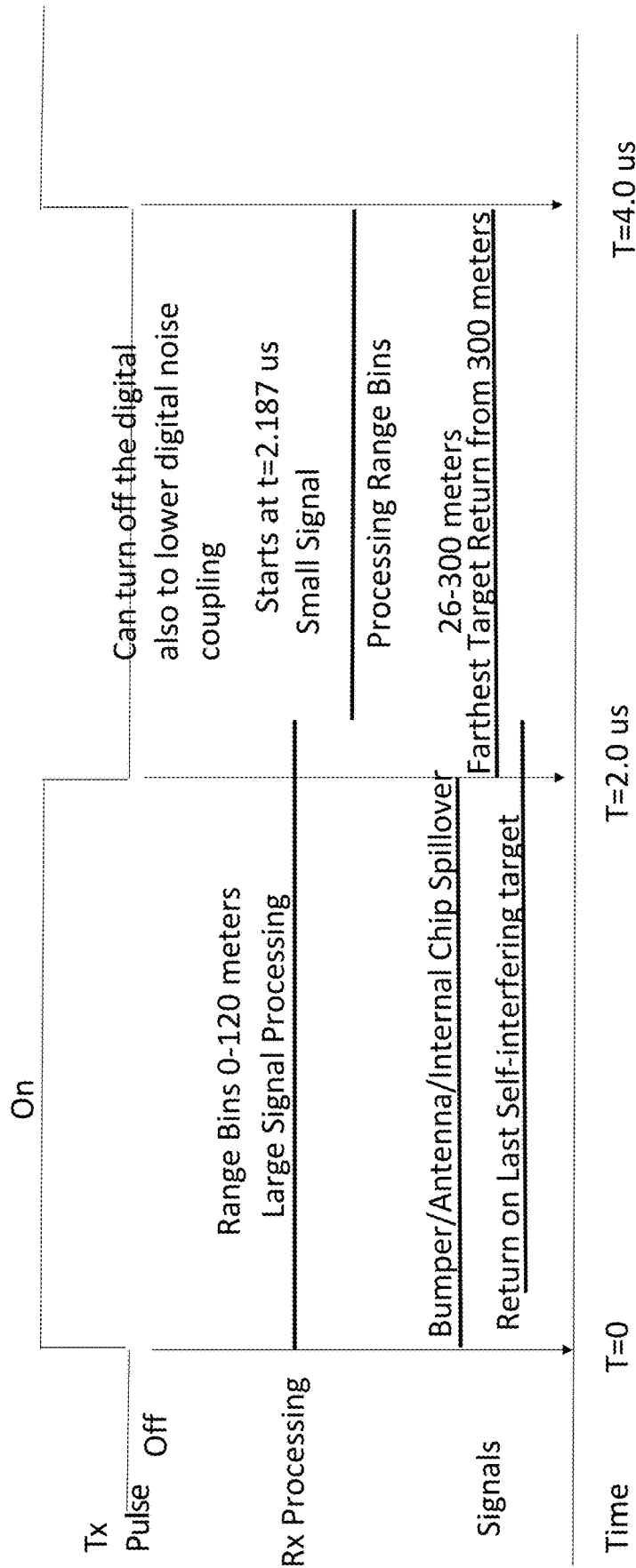
FIG. 19 is a flow diagram illustrating the timing of the processing of the reflected signals of FIG. 18 in accordance with the present invention.

In order to mitigate the effect of the sidelobes from near targets, the power level of the transmitted signal may be varied. In an aspect of the present invention, the power level of the transmitted RF signal may be varied such that the transmission power decreases over time during a selected period of time and then repeats. For example, as illustrated in FIGS. 18 and 19, the transmitted power level may be adjusted between two levels. During a first time period of 2 μs the transmitter is ON (and at full power), then during a second time period of 2 μs the transmitter is OFF. A target at a distance of 25 meters (with a total distance of 50 meters from radar transmitter to target and back to radar receiver) takes 0.167 µs. Thus, the receiver will receive this strong reflected RF signal from time T=0.167 µs to time T=2.167 µs. On the other hand, a target at 300 m will have a round trip time of 2.0 µs. The reflected RF signal received after 2.0 µs will be received from time T=2.0 µs to time T=4.0 µs (the second time period). During the first 0.167 µs of this second duration, the received signal may be ignored. There will therefore be no interference from the close-in target for the time from T=2.167 µs to time T=4 µs. However, there is a downside to this approach. The transmitter is only ON half the time. Furthermore, the receiver only listens (for the more distant target) a somewhat reduced amount of time (instead of listening from 2-4 µs, the receiver listens from 2.167-4.0 µs). As such, these two factors give rise to a reduction in the signal level by about 3.4 dB. However, the interference from the near in target has been completely isolated and removed.

FIG. 19 illustrates exemplary transmission and receiver processing timelines. As illustrated in FIG. 19, the transmitter(s) may be ON for a first time period of T=0 to T=2.0 µs, and then OFF for a second time period of T=2.0 to 4.0 µs. During the second time period, the digital receiver may also be turned OFF to further lower digital noise coupling. If the digital receiver should need to be turned OFF to achieve the desired level of noise, the analog signal may be saved in a buffer for later digital processing. While the later digital processing will further slow the radar system and further reduce performance, it is an option under some circumstances.

Figure 20:
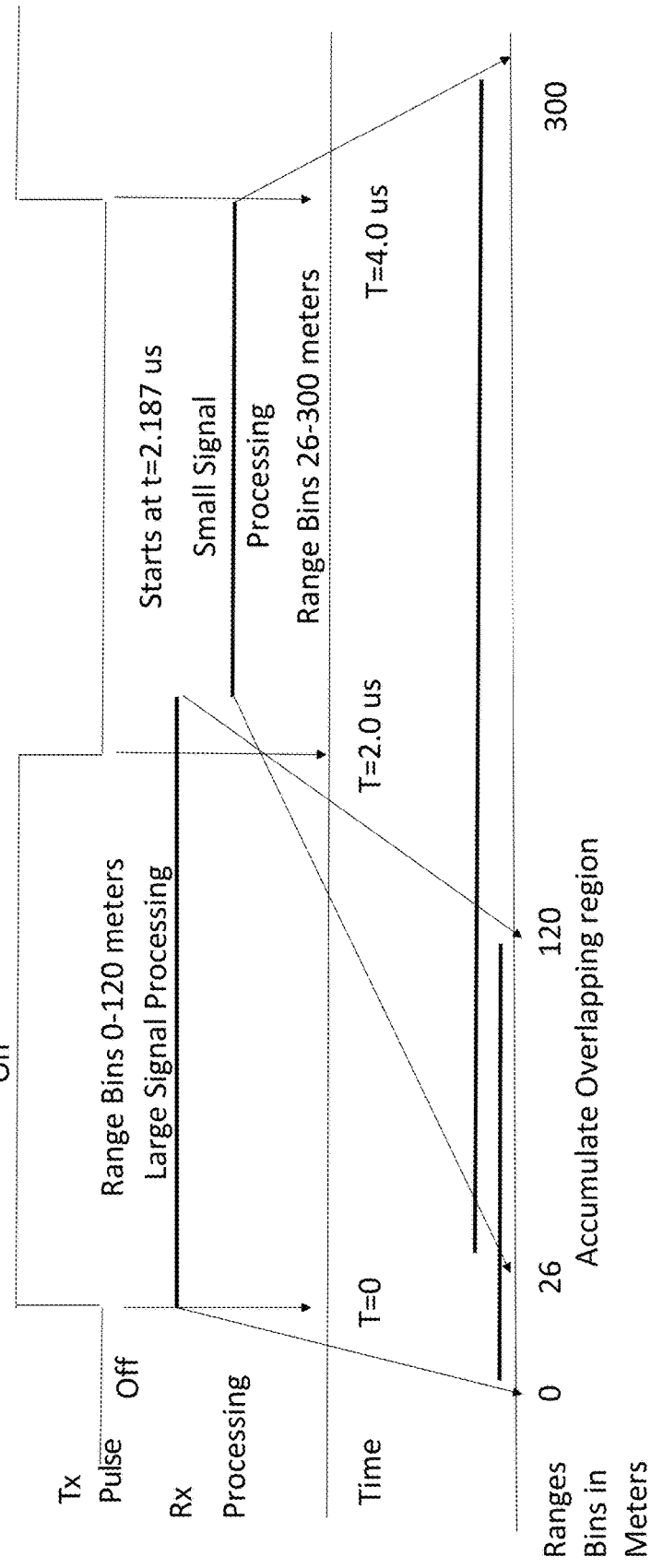
FIG. 20 is a flow diagram illustrating the timing of the processing of the reflected signals of FIG. 18 in accordance with the present invention.

As also illustrated in FIG. 19, receiver processing may include "large" signal processing for the range bins covering 0-120 meters during the first time period, and then at 2.187 µs, "small" signal processing for the range bins covering 26-300 meters may take place. Large signal processing includes the processing of reflected signals from near targets while small signal processing includes the processing of reflected signals from more distant targets. FIG. 19 illustrates that reflected RF signals during the first time period will include interference from the bumper, antenna, and internal chip spillover, with the last self-interfering target also returning during the first time period. FIG. 19 also illustrates that the farthest target returned during the second time period will be from 300 meters. The range bin accumulations are also illustrated in FIG. 20, where the range bin accumulations during the first and second time periods are shown to overlap for the range bins for 26-120 meters.

Figure 15:
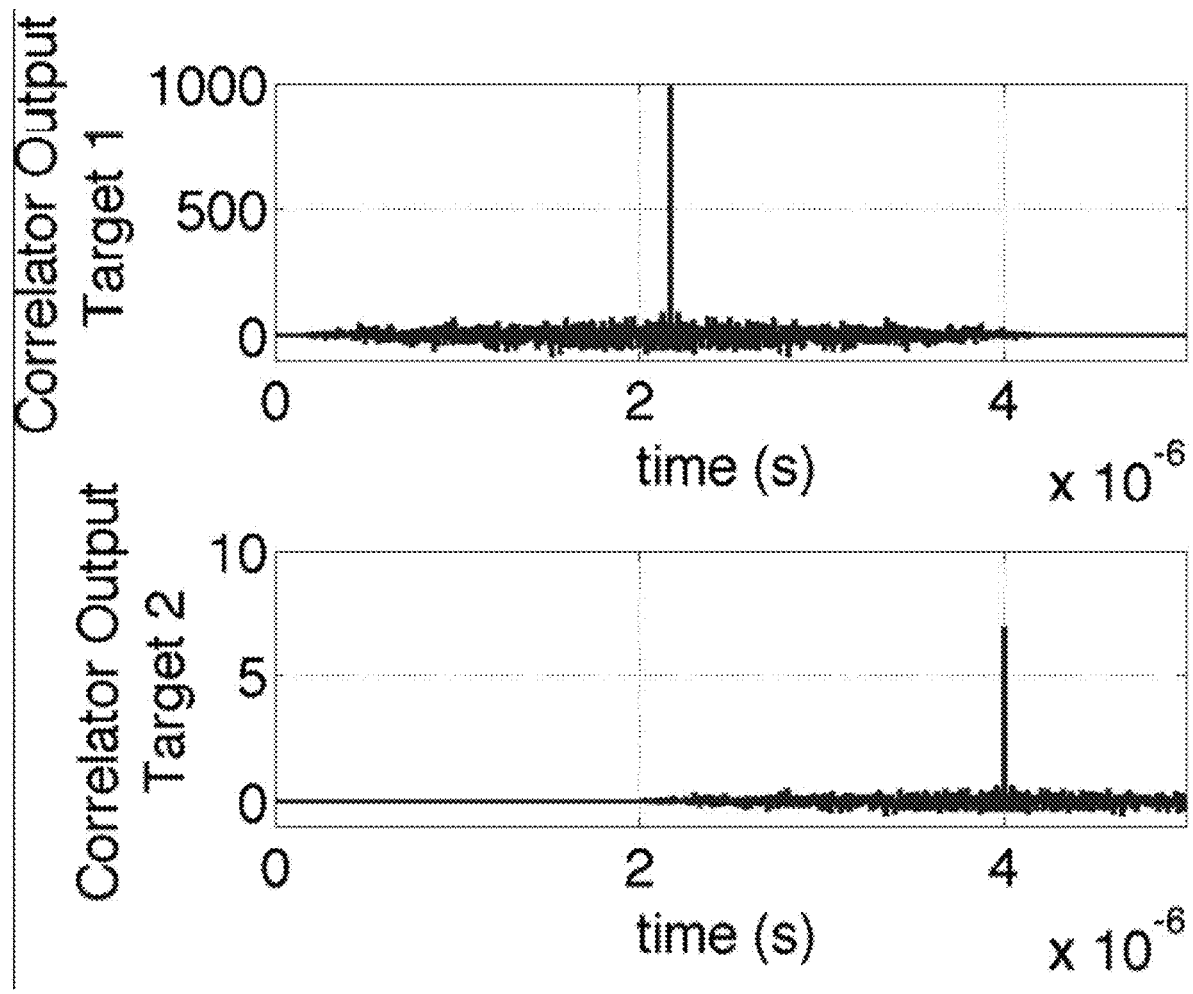
FIG. 15 is a pair of graphs illustrating the output of correlators with delays of the replica for two objects with discontinuous transmission in accordance with the present invention.
Figure 16:
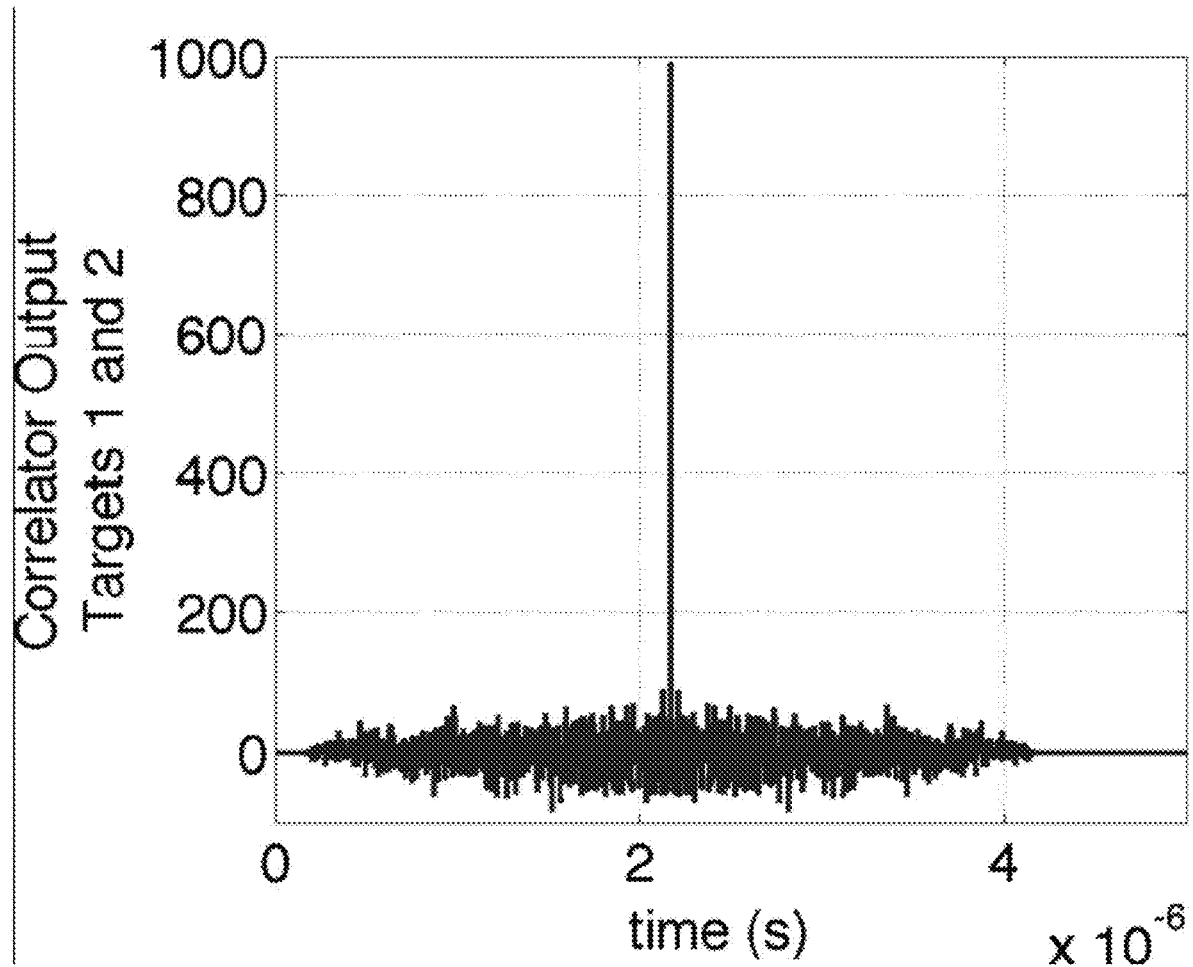
FIG. 16 is a graph illustrating the correlator outputs for total signal strength from the sum of the outputs from FIG. 15 in accordance with the present invention.
Figure 17:
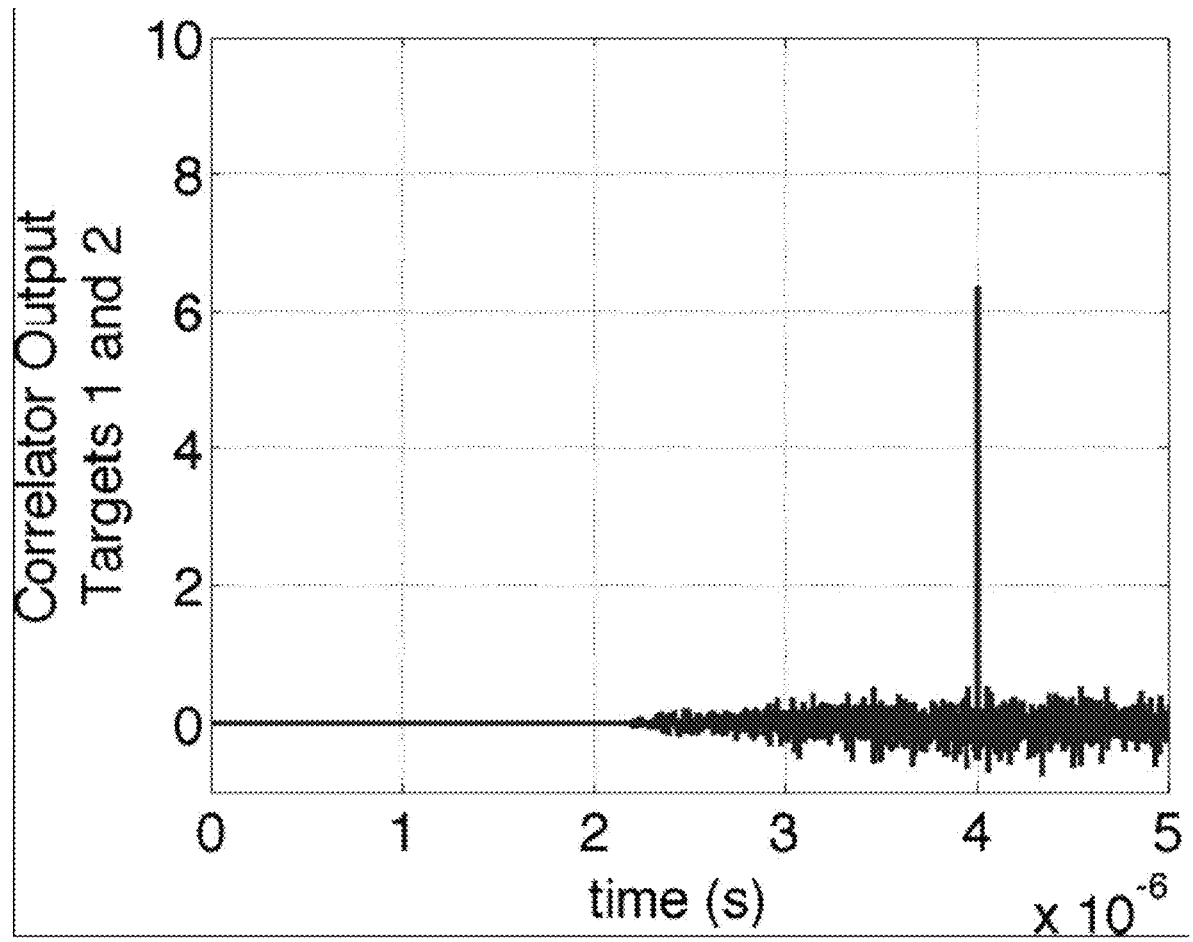
FIG. 17 is a graph illustrating a portion of the total signal strength (zoomed in) of FIG. 16 in accordance with the present invention.

FIG. 15 is a graph illustrating the correlator outputs with the above described discontinuous transmission (i.e., a duty cycle where the transmitter is turned ON for a period of time and then turned OFF for a period of time) with a target at 25 meters and a target at 300 meters. The top plot is the correlator outputs for the signal received from just the first target, while the bottom plot shows the correlator outputs for just the distant target. The output due to the near target dies out because the transmitted RF signal has been terminated. However, the distant target will still cause an output for the correlators for longer delays (range bins). Because the near target still causes an output after 2 µs there are still relatively large outputs due to the first target. FIG. 16 is a graph illustrating the output due to the sum of these two targets. The first target still dominates the peak correlator output due to the second target because the far target will start arriving at 2 µs while the near target will not finish arriving until 2.167 µs. If the receiver ignores the output until 2.167 µs, then the signal from the near target will be gone and the received signal will only be from the far target. FIG. 17 shows the output of correlators when the receiver only processes the signal after 2.167 µs.

Figure 21:
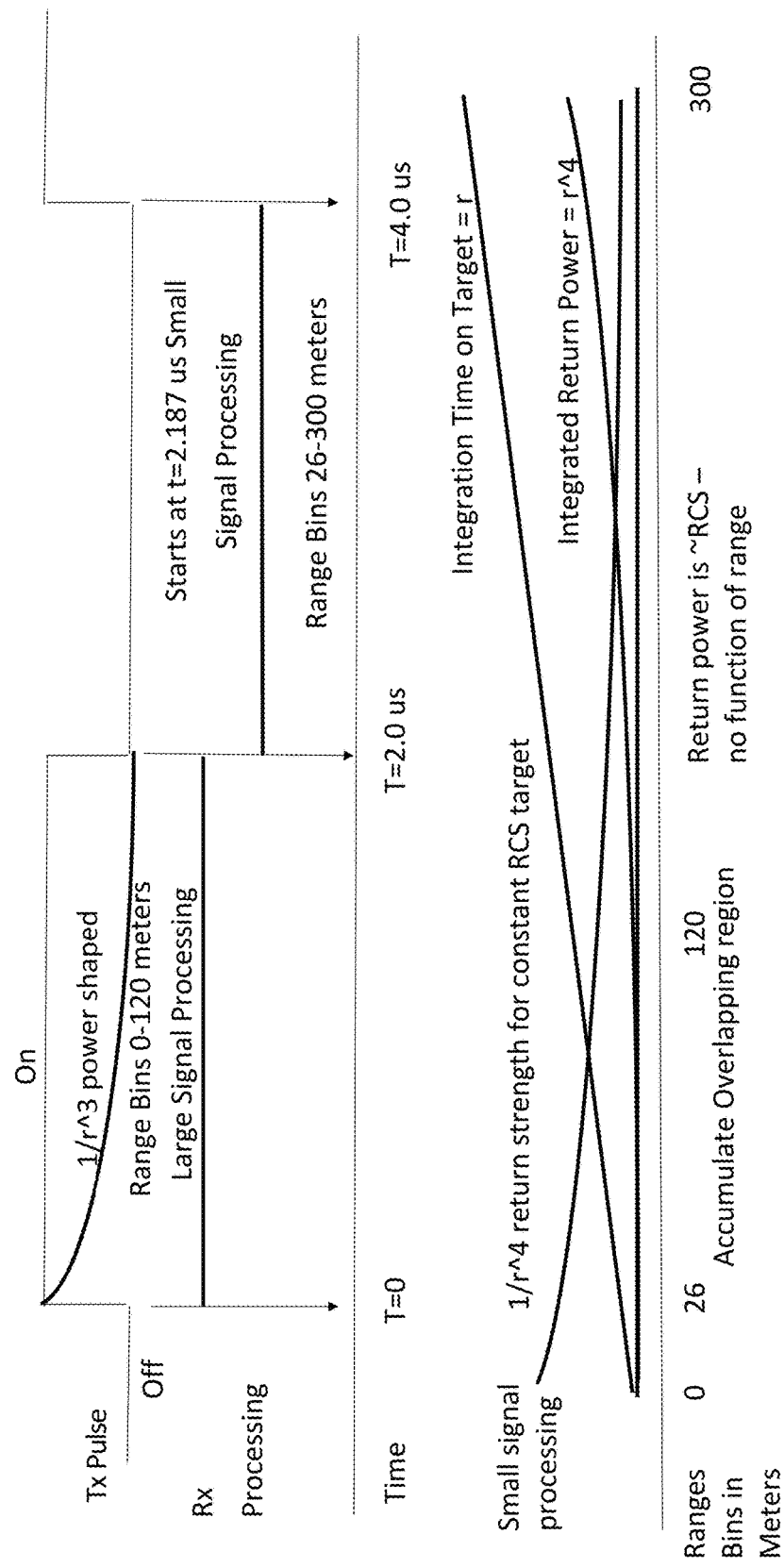
FIG. 21 is a flow diagram illustrating a power shaping of the transmission, a timing of processing of reflected signals, and a corresponding plot of reflected signal strength in accordance with the present invention.
Figure 22:
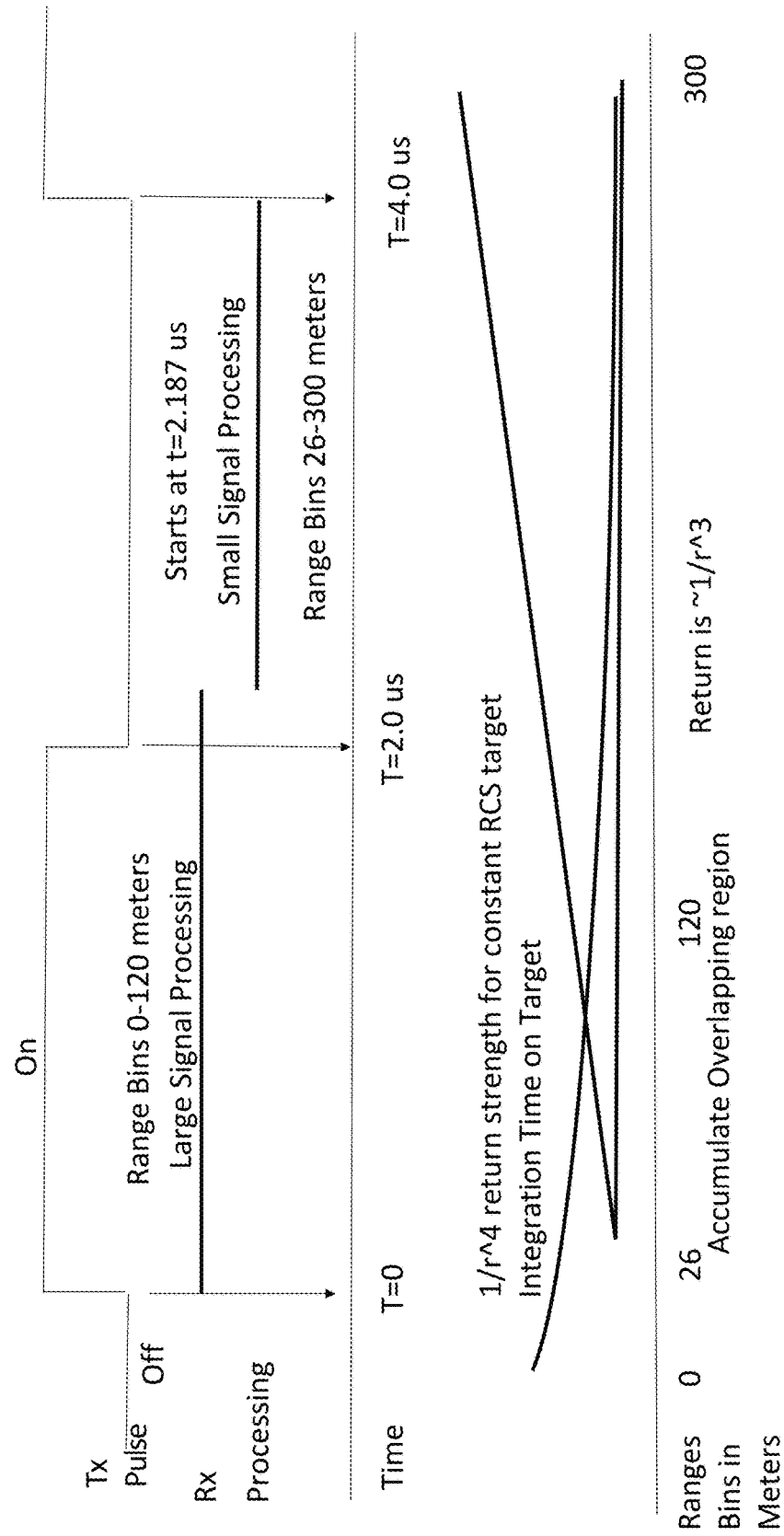
FIG. 22 is a flow diagram further illustrating the timing of processing of reflected signals and a corresponding plot of reflected signal strength in accordance with the present invention.

The above described process of turning the transmitter power ON and then OFF is one possible way to be able to detect a more distant target in the presence of a near target. However, there are other ways this can be done. An alternative is to continuously reduce transmission power level as a function of time so that when a reflected RF signal from a more distant target is arriving at the radar receiver, the reflected RF signal from a near target has a significantly reduced amplitude. This is illustrated in FIGS. 21 and 22. This can be done by decreasing the amplitude of the transmitted RF signal as a function of time so that the reflected RF signal from a nearby target is actually much weaker than the reflected RF signal from a more distant target by the time the far target's reflection arrives at the radar receiver. In an aspect of the present invention, and as illustrated in FIG. 21, the transmitted RF signal may be power shaped according to the equation $1/r^4$, where α is between 2.0 and 4.0, such that the transmitted signal power level decreases over time from a peak at T=0 until T=2.0 µs.

FIGS. 21 and 22 also illustrate that when a returning RF signal decays with time according to $1/r^4$ (due to a power-shaped transmitted RF signal), a constant signal strength is received for objects at various distances, such that they have a constant RCS. In other words, because of the constantly decreasing transmission power, the RCS of near targets will have diminished by the time the more distance targets with similar RCS would have reflected back and finally received. So, when the signal from the far target is received, the signal from the near target will have the same signal strength because the transmitted signal has been reduced in power from the time the signal from the far target was transmitted to the time the signal from the near target was transmitted.

Another method for reducing a reflected RF signal's power level from a near target relative to a more distant target is to turn OFF the transmitter for some fraction of time, where the fraction of time is an increasing function of time. For example, for the first 0.1 µs, the transmitter is powered ON all the time, then for the second 0.1 µs, the transmitter is powered ON 90% of the time. The fraction of time the transmitter is powered ON continues to decrease so that by the time the reflected signal from a more distant target is arriving, the reflected signal from a nearby target has a duty factor that is quite small and thus creates relatively little interference. This is called pulsing.

An alternative to pulsing the transmitted RF signal to dynamically reduce the transmitted power level is to switch transmission frequencies in a manner that allows the RF signal reflected off the more distant object to be received even though a nearby target is also reflecting the transmitted signal. In this way, the transmitter is always transmitting, but at different frequencies. For example, the radar system may transmit on frequency $f_1$ for 2 µs and then after switching to a different frequency $f_2$, continue transmitting for another 2 µs. A receiver attempting to detect an object/target at 300 meters distance would listen on frequency $f_1$ during the second time interval from 2.167 µs until 4 µs. In this way, the RF signal received from a reflection off of the near target would be on a different frequency than the RF signal reflected off of the far target from time T=2.167 µs until T=4.0 µs. This method has the advantage of always transmitting (on some frequency), but with the disadvantage of needing to be able to transmit at two different frequencies and receive at two different frequencies. The bandwidth would be divided into at least two parts in this example.

Figure 23:
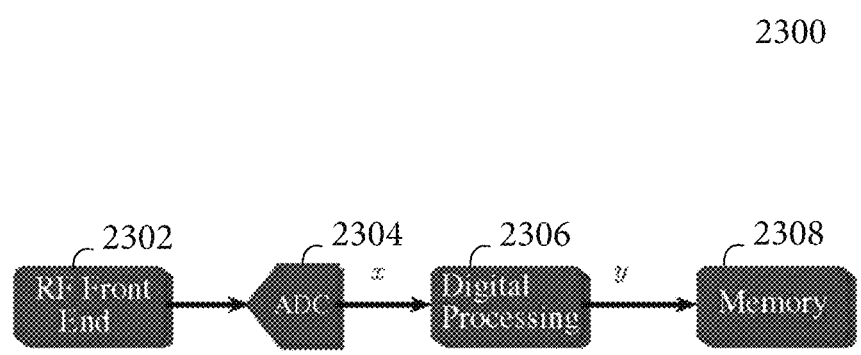
FIG. 23 is a block diagram of an exemplary receiver for the radar system of the present invention.

Receiver Functionality with Pulsed PMCW Radar:

In an aspect of the present invention, a radar receiver 2300, illustrated in FIG. 23, comprises an RF front end 2302, an analog to digital converter (ADC) 2304, a digital signal processor (DSP) 2306, and a memory 2308. An exemplary RF signal is transmitted by a radar transmitter from a time T=0 to T=1.832 μs, and with a chip rate of 500 million chips per second. Each chip has a 2 ns duration. A transmission duration of 1.832 μs corresponds to 916 chips being transmitted. The delay of a reflection from an object at a distance of 25 meters is 0.166 μs (the time required for the transmitted RF signal to travel from the radar's transmitter, reflect off an object/target, and be received by the radar's receiver). This means that there are about 83 chips round trip for an object that is 25 meters away. While there are 500 chips round trip for an object that is 150 meters away, and 1000 chips round trip for an object that is 300 meters away. This means that the transmitter will have been turned OFF for 168 ns before a reflected RF signal from 300 meters is received. Additionally, the reflected RF signal from an object 25 meters away will have already been completely received by the time the reflected RF signal from the object at 300 meters is received. Therefore, a receiver which turns ON at 2 μs and turns OFF at 3.832 μs will be able to process all the chips from an object at 300 meters. However, an object that is 150 meters away will cause a reflected RF signal to be received at the receiver starting at 1 μs. Since the receiver turns ON at 2 μs, the receiver will only receive 416 chips of the reflected RF signal from an object at 150 meters. As such, the processing gain associated with nearer objects will be less than objects further away. Of course, the objects at a farther distance will result in reflected RF signals that are received with less power and will need more processing gain.

Figure 24:
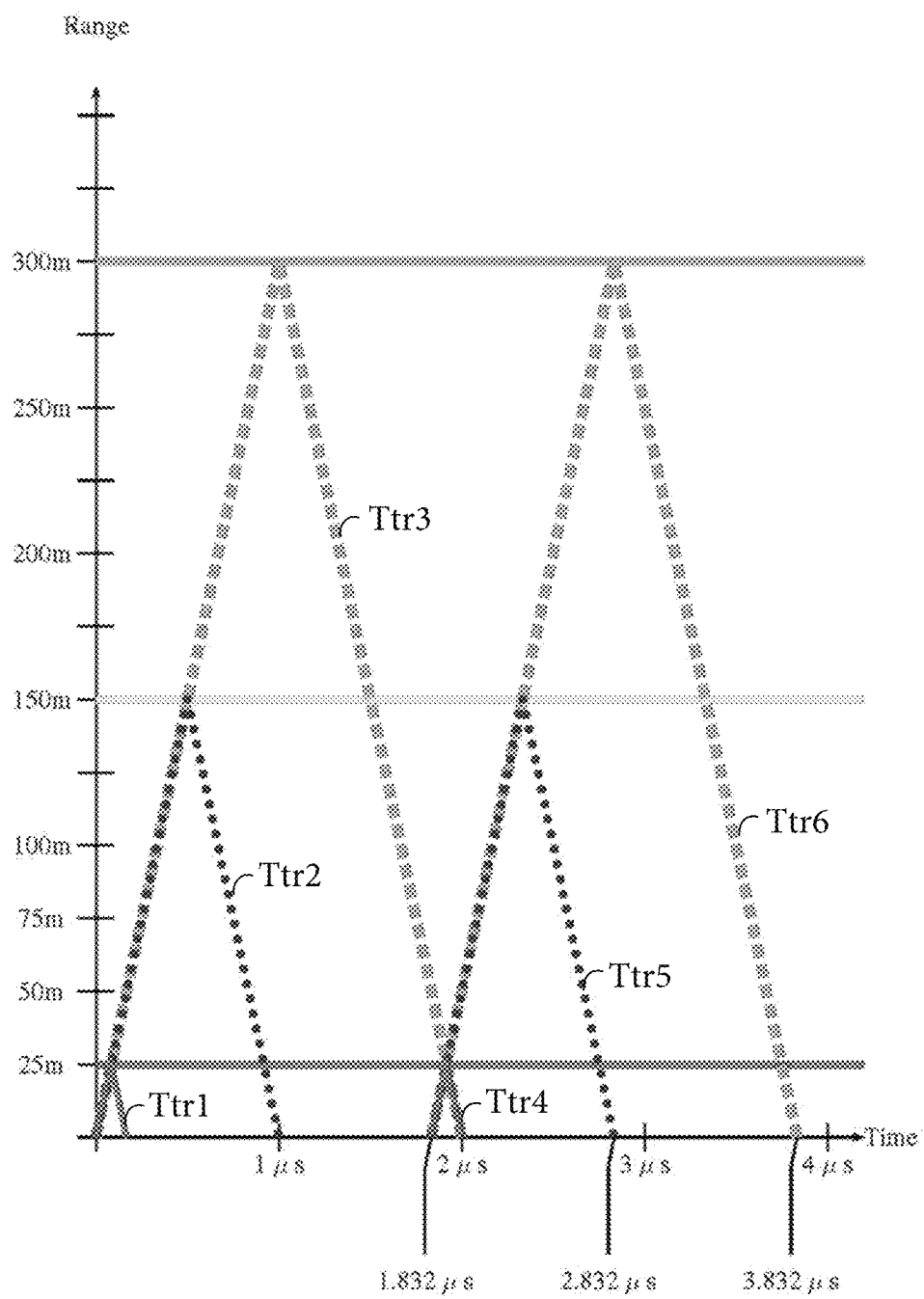
FIG. 24 is an exemplary timing diagram for objects at different distances in accordance with the present invention.

FIG. 24 illustrates a timing diagram for this scenario. Time traces are provided for targets at 25 (Ttr1), 150 (Ttr2), and 300 (Ttr3) meters. As illustrated in FIG. 24, the reflected RF signal (Ttr2) from the target at 150 meters is received at 1.0 μs, while the reflected RF signal (Ttr3) from the target at 300 meters is received at 2.0 μs. As also illustrated in FIG. 24, the RF signal is terminated at time T=1.832 μs with the last reflected RF signal (Ttr4) from the target at 25 meters received at 2.0 μs. FIG. 24 also illustrates that the second reflected RF signal (Ttr5) from the target at 150 meters is received between times 1 μs and 2.832 μs, while the third reflected RF signal (Ttr6) from the target at 300 meters is received between times 2 μs and 3.832 μs.

Figure 25:
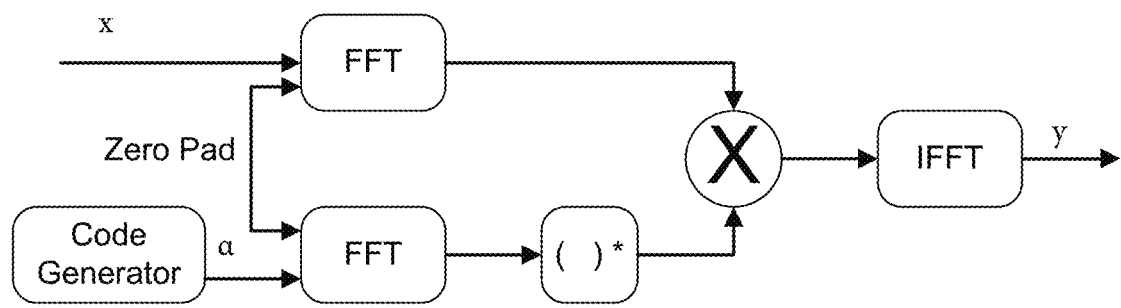
FIG. 25 is a block diagram of an exemplary digital processor for determining signal correlation with required spreading codes in accordance with the present invention.
Figure 26:
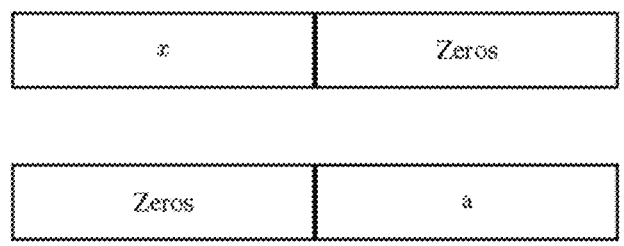
FIG. 26 illustrates FFT inputs for the receiver of FIG. 25 in accordance with the present invention.

In an aspect of the invention, the receiver 2300 may comprise the digital processor 2306 illustrated in FIG. 23. The exemplary digital processor 2306 determines the correlations of the received RF signals ("x") with the required spreading codes ("α"), and as illustrated in FIG. 25, may be implemented with several FFT operations, an IFFT operation, and a mixer. The output of the ADC 2304, when the receiver 2300 is ON, is used as an input to the FFT. As illustrated in FIGS. 25 and 26, the output from the ADC 2304 may be padded (appended) with an equal number of zeros (e.g., 916). Meanwhile, as also illustrated in FIGS. 25 and 26, a code generator that has generated 916 chips may be zero padded (prepended).

See FIGS. 25 and 26 for exemplary FFT inputs where the ADC output is padded (appended) and the code generator output is zero padded (prepended). An FFT is taken of each of these two zero-padded signals. A complex conjugate is then applied to the output of the FFT that receives the chips ("α") from the code generator. The result is then mixed with the output of the FFT that receives the received signal ("x").

Then an inverse FFT (IFFT) is taken. The result is all of the correlations at the range bins between 25 and 300 meters. This output is then stored in memory 2308.

In an aspect of the present invention, exemplary targets are located at 25 meters, 150 meters, and 300 meters. There is an assumed propagation loss between the radar's transmitter and receiver that is proportional to distance to the fourth power. This corresponds to a power loss in each direction (radar transmitter to target and target to radar receiver) proportional to the distance squared (e.g., free space path loss). In this case, the propagation loss is 43.2 dB larger for the target at 300 meters when compared to the target at 25 meters. The propagation loss is 12.0 dB larger for the target at 300 meters when compared to the propagation loss for the target at 150 meters. So, even with a receiver that ignores all received signals before time T=2.0 μs, which will ignore the reflection from the object at 25 meters, there will be a signal from the reflection of the target at 150 meters that will be 12.0 dB larger (for the same RCS) than the reflected signal from the object at 300 meters.

Depending on the environment, an exemplary radar receiver could receive the reflected RF signal during a shortened time window and thus reduce the window of time that the receiver processes the received RF signal. The result is that the reflected RF signals from targets that are closer to the transceiver (receiver/transmitter) than the target of interest (e.g., the one at 300 meters) will be reduced in the effect they have on the correlations performed for a range bin at 300 meters. While this removes interference that is much larger than the reflected RF signal from the object at 300 meters, it also removes some of the desired RF signal. For some receiver windows, the target at 300 meters becomes detectable. This depends on the radar cross sections (RCSs) of the targets and their relative distances.

Figure 27:
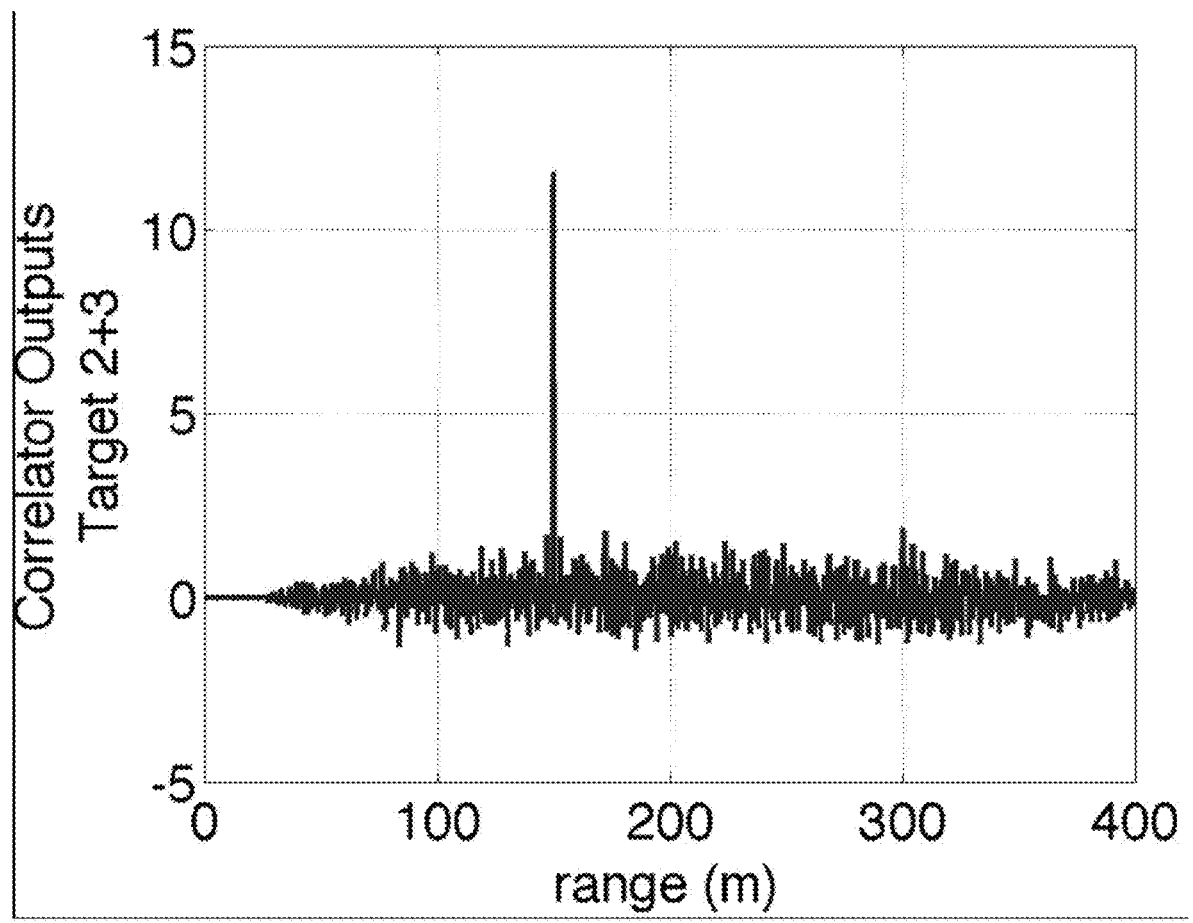
FIG. 27 is a graph illustrating normalized correlator outputs for objects at 150 and 300 meters when signal processing is performed from 2.0-3.832 microseconds.

For example, consider an exemplary target at 150 meters and another exemplary target at 300 meters with a 10 dB smaller RCS. The received RF signal from the target at 300 meters will be 53.2 dB smaller than from the target at 150 meters. As such, the sidelobes of the correlation values corresponding to the target at 150 meters will be larger than the main peak of the correlation values corresponding to the target at 300 meters. FIG. 27 illustrates the magnitude of the correlation values when the received RF signal is evaluated starting at time, T=2.0 μs and continuing until T=3.832 μs. Then the receiver is turned OFF, ignoring the reflected signal until T=2.0 μs. There is no indication of the target at 300 meters in FIG. 27 because the RF signal reflecting from the target at 150 meters is dominating the RF signal reflecting from the target at 300 meters.

Figure 28:
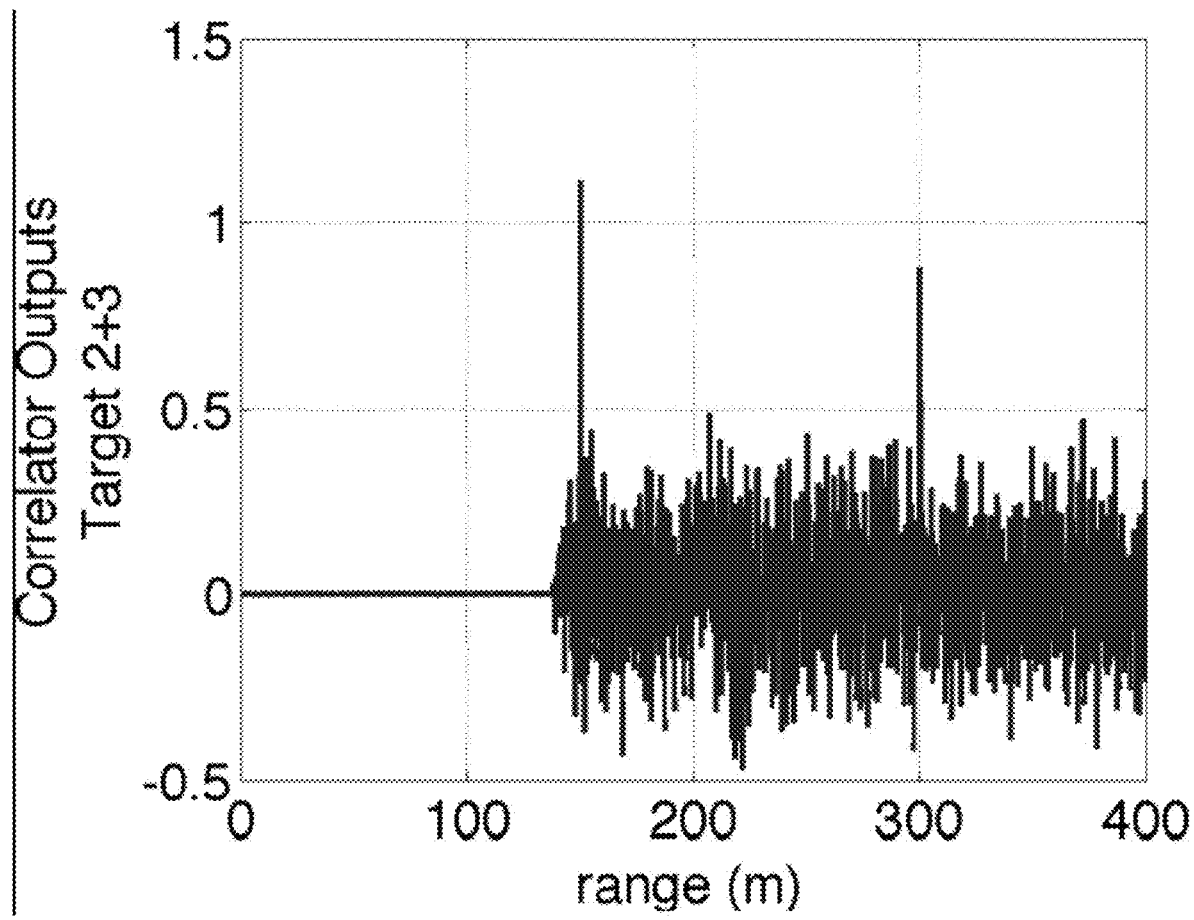
FIG. 28 is a graph illustrating normalized correlator outputs for objects at 150 and 300 meters when signal processing is performed from 2.5-3.832 microseconds.
Figure 29:
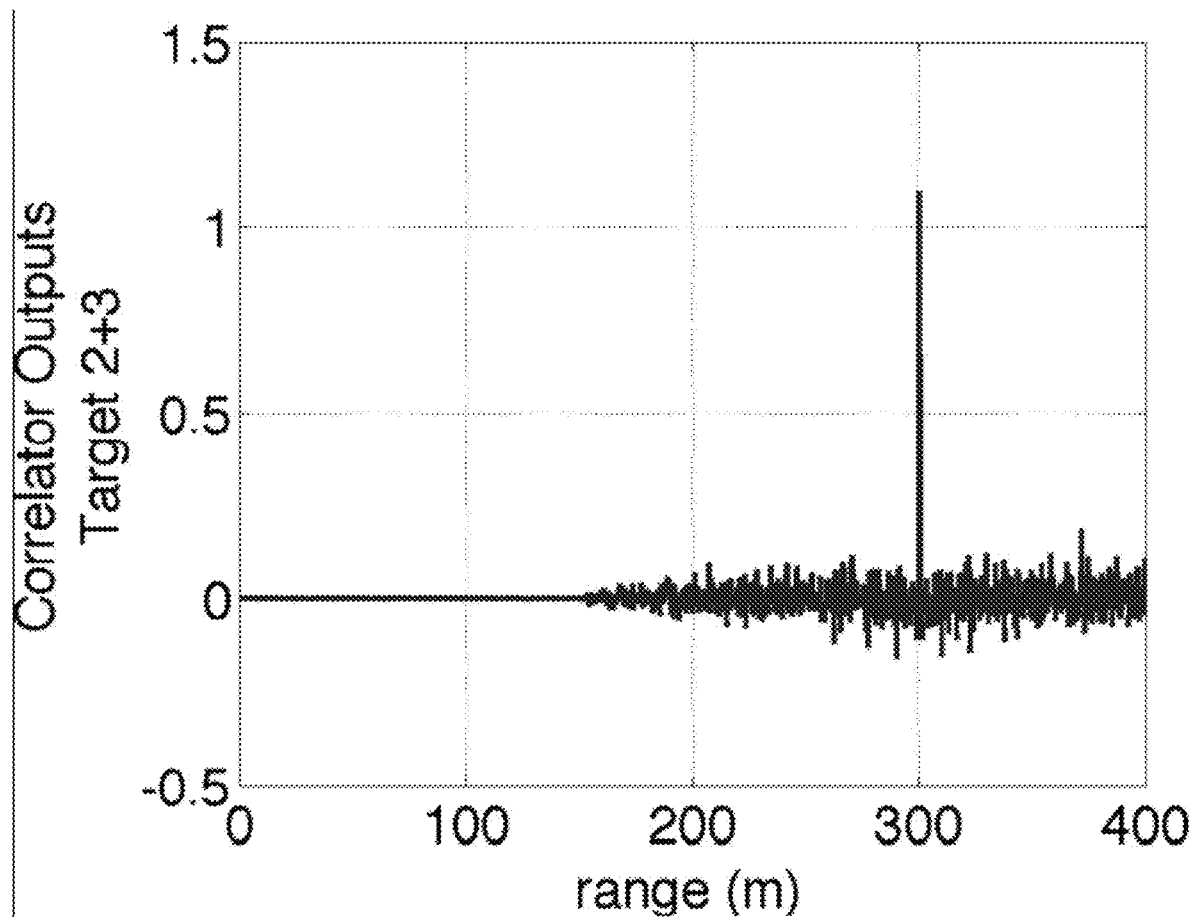
FIG. 29 is a graph illustrating normalized correlator outputs for objects at 150 and 300 meters when signal processing is performed from 2.832-3.832 microseconds.

FIG. 28 illustrates normalized correlation values when the radar receiver evaluates the received RF signal from time T=2.5 μs to T=3.832 μs. The receiver ignores the received RF signal until T=2.5 μs. In FIG. 28 the radar receiver has ignored a large part of the much stronger reflected RF signal from the target at 150 meters. The receiver has also ignored some of the reflected RF signal from the target at 300 meters. However, since the RF signal reflecting from the target at 150 meters is much stronger than the RF signal reflecting from the target at 300 meters, there is an overall improvement in recognizing the target at 300 meters. FIG. 29 illustrates the normalized correlation output values when the receiver ignores the received RF signal till T=2.832 μs, which means the entire RF signal reflecting from the target at 150 meters is ignored. Now the target at 300 meters is clearly visible.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A radar sensing system for a vehicle, the radar sensing system comprising:
    a transmitter configured for installation and use on a vehicle, and configured to transmit continuous wave radio signals, wherein the transmitter is configured to turn ON and transmit during a first time interval of a plurality of time intervals, and configured to turn OFF and not transmit during a second time interval of the plurality of time intervals that is after the first time interval;
    a receiver configured for installation and use on the vehicle, and configured to receive continuous wave radio signals, wherein the received radio signals include the transmitted radio signals reflected from targets in the environment;
    a processor, wherein the received radio signals are provided to the processor;
    wherein the processor processes the received radio signals during the plurality of time intervals, wherein different time intervals of the plurality of time intervals contain different signal levels of radio signals reflected from first and second targets in the environment, wherein the first target is closer than a first threshold distance from the vehicle, and wherein the second target is farther than the first threshold distance from the vehicle; and
    wherein, responsive to processing the received radio signals during the plurality of time intervals, the processor selects a particular time interval of the plurality of time intervals that is free of radio signals reflected off of the first target.

2. The radar sensing system of claim 1, wherein radio signals reflected from the first target are received during the first time interval, and wherein radio signals reflected from the second target are received during the second time interval.

3. The radar sensing system of claim 2, wherein the radio signals reflected from the first target are not received during the second time interval.

4. The radar sensing system of claim 1, wherein the processor produces a stream of samples from the received radio signals.

5. The radar sensing system of claim 4, wherein the processor processes samples of radio signals reflected off the second target that are received during the second time interval.

6. The radar sensing system of claim 4, wherein the processor processes samples of radio signals reflected off the first target that are received during the first time interval.

7. The radar sensing system of claim 1, wherein the transmitter is configured to transmit a continuous wave radio signal.

8. The radar sensing system of claim 1, wherein, during the first time interval, the received radio signals comprise radio signals reflected from the first target, and wherein, during the second time interval, the received radio signals comprise radio signals reflected from the second target that are smaller than the radio signals reflected from the first target during the first time interval.

9. The radar sensing system of claim 8, wherein radio signals reflected from the first target during the second time interval are not large enough to interfere with the radio signals reflected from the second target.

10. The radar sensing system of claim 1, wherein, during the first time interval of the plurality of time intervals, radio signals reflected from the first target are processed for range bins for a first distance range, and wherein, during the second time interval of the plurality of time intervals, radio signals reflected from the second target are processed for range bins for a second distance range, and wherein at least a portion of the second distance range is farther way than the first distance range.

11. The radar sensing system of claim 1, wherein the processor is configured to select a time interval of the plurality of time intervals to process received radio signals for a selected plurality of range bins.

12. The radar sensing system of claim 11, wherein the processor processes received radio signals for range bins associated with a range of 0-120 meters during the first time interval, and wherein the processor processes received radio signals for range bins associated with a range of 26-300 meters during the second time interval.

13. The radar sensing system of claim 1, wherein, during the first time interval, the receiver is turned OFF and the reflected radio signals are ignored, and wherein, during the second time interval, the receiver is turned ON and the reflected radio signals are received.

14. The radar sensing system of claim 1, wherein, during the first time interval, digital processing is turned OFF and received radio signals are saved to a buffer for later processing.

15. The radar sensing system of claim 1, wherein the transmitter is configured to power shape the transmitted radio signals during the first time interval.

16. The radar sensing system of claim 15, wherein, during the first time interval, the transmitted radio signals are decreasing in power.

17. The radar sensing system of claim 15, wherein the transmitter is configured to pulse the transmitted radio signals with a plurality of duty cycles during the first time interval.

18. The radar sensing system of claim 1, wherein the first target comprises a plurality of first targets, and wherein each of the plurality of first targets is closer than the first threshold distance from the vehicle, and wherein the second target comprises a plurality of second targets, and wherein each of the plurality of second targets is farther than the first threshold distance from the vehicle.

19. A radar sensing system for a vehicle, the radar sensing system comprising:
    a transmitter configured for installation and use on a vehicle, and configured to transmit continuous wave radio signals, wherein the transmitter is configured to pulse the transmitted radio signals with a duty cycle that reduces over time;
    a receiver configured for installation and use on the vehicle, and configured to receive continuous wave radio signals, wherein the received radio signals include the transmitted radio signals reflected from targets in the environment, wherein the targets in the environment comprise first and second targets, wherein the first targets are closer than a first threshold distance from the vehicle, and wherein the second targets are farther than the first threshold distance from the vehicle;
    wherein the received radio signals are provided to a processor;
    wherein the processor processes the received radio signals during a plurality of time intervals, and wherein different time intervals of the plurality of time intervals contain different signal levels of radio signals reflected from the targets in the environment; and wherein, responsive to processing the received radio signals during the plurality of time intervals, the processor selects a particular time interval of the plurality of time intervals that is free of radio signals reflected off of the first targets.

20. The radar sensing system of claim 19, wherein pulsing the transmitted radio signals with a duty cycle that reduces over time decreases a power level of the transmitted radio signals over time.

21. The radar sensing system of claim 20, wherein the processor processes the received radio signals that are reflected from the first targets during a first time interval of the plurality of time intervals, and wherein the processor processes the received radio signals that are reflected from the second targets during a second time interval of the plurality of time intervals that is after the first time interval.

22. The radar sensing system of claim 21, wherein, during the first time interval, the received radio signals comprise radio signals reflected from the first targets, and wherein, during the second time interval, the received radio signals comprise radio signals reflected from the second targets that are smaller than the radio signals reflected from the first targets during the first time interval, and wherein radio signals reflected from the first targets during the second time interval are not large enough to interfere with the radio signals reflected from the second targets.

23. A radar sensing system for a vehicle, the radar sensing system comprising:
- a transmitter configured for installation and use on a vehicle, and configured to transmit continuous wave radio signals;
- a receiver configured for installation and use on the vehicle, and configured to receive continuous wave radio signals, wherein the received radio signals include the transmitted radio signals reflected from targets in the environment, and wherein the targets in the environment comprise first and second targets, and wherein the first targets are closer than a first threshold distance from the vehicle, and wherein the second targets are farther than the first threshold distance from the vehicle;

wherein the receiver receives radio signals during selected time intervals of a plurality of time intervals, and wherein a particular time interval of the plurality of time intervals is free of radio signals reflected from the first targets;

wherein the received radio signals are provided to a processor;

wherein the processor processes the received radio signals during the plurality of time intervals, and wherein different time intervals of the plurality of time intervals contain different signal levels of radio signals reflected from the targets in the environment.

24. The radar sensing system of claim 23, wherein, during a first time interval of the plurality of time intervals, radio signals reflected from the first targets are processed for range bins for a first distance range, and wherein, during a second time interval of the plurality of time intervals that is after the first time interval, radio signals reflected from the second targets are processed for range bins for a second distance range, and wherein at least a portion of the second distance range is farther way than the first distance range.

25. The radar sensing system of claim 24, wherein, during the first time interval, the received radio signals comprise radio signals reflected from the first targets, and wherein, during the second time interval, the received radio signals comprise radio signals reflected from the second targets that are smaller than the radio signals reflected from the first targets during the first time interval, and wherein radio signals reflected from the first targets during the second time interval are not large enough to interfere with the radio signals reflected from the second targets.

* * * * *